(12) United States Patent
Ishii

(10) Patent No.: US 10,771,643 B2
(45) Date of Patent: Sep. 8, 2020

(54) INFORMATION PROCESSING SYSTEM, INFORMATION PROCESSING TERMINAL, AND INFORMATION PROCESSING METHOD

(71) Applicant: Nanami Ishii, Kanagawa (JP)

(72) Inventor: Nanami Ishii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/552,004

(22) Filed: Aug. 27, 2019

(65) Prior Publication Data

US 2020/0099808 A1   Mar. 26, 2020

(30) Foreign Application Priority Data

Sep. 26, 2018  (JP) ................................ 2018-181064

(51) Int. Cl.
*H04N 1/00* (2006.01)
*G06F 16/16* (2019.01)

(52) U.S. Cl.
CPC ....... *H04N 1/00501* (2013.01); *G06F 16/162* (2019.01); *G06F 16/168* (2019.01); *H04N 1/00395* (2013.01); *H04N 1/00424* (2013.01)

(58) Field of Classification Search
CPC ........... H04N 1/00424; H04N 1/00395; H04N 1/00501; G06F 16/168; G06F 16/162

USPC ........................................................ 358/1.13
See application file for complete search history.

(56) References Cited

U.S. PATENT DOCUMENTS

2009/0279113 A1\* 11/2009 Awata ................ H04N 1/00482
358/1.9

FOREIGN PATENT DOCUMENTS

JP         2006-109238         4/2006

\* cited by examiner

*Primary Examiner* — Saeid Ebrahimi Dehkordy
(74) *Attorney, Agent, or Firm* — IPUSA, PLLC

(57) ABSTRACT

An information processing system causes a screen displayed by an information processing terminal to transition to another screen according to an operation by a user. The information processing system includes a screen configurator configured to generate screen data of the screen and cause the information processing terminal to display the screen, the screen being configured to accept, from the user, a selection operation of a parameter, a deletion operation of the parameter, a validation operation of the selected parameter, and a cancellation operation of the selection operation; and an information manager configured to manage parameter information of the parameter for which the validation operation was last accepted, held by a holder. The screen configurator generates the screen data so as to reject the deletion operation of deleting the parameter for which the validation operation was last accepted, based on the parameter information.

10 Claims, 20 Drawing Sheets

FIG.5

| FOLDER LIST SCREEN | FILE LIST SCREEN | HISTORY SCREEN | SEARCH SCREEN |
|---|---|---|---|
| CURRENTLY SELECTED FOLDER ID, FOLDER NAME | CURRENTLY SELECTED FOLDER ID, FOLDER NAME | ENTRY IN HISTORY | SEARCH KEYWORD |
| ENTRY IN CURRENTLY SELECTED FOLDER | ENTRY IN CURRENTLY SELECTED FOLDER | SELECTED FILE ID | SEARCH RESULT |
| FOLDER ID, FOLDER NAME OF PARENT FOLDER | FOLDER ID, FOLDER NAME OF PARENT FOLDER | | PAGE NUMBER |
| PAGE NUMBER | PAGE NUMBER | | SELECTED FILE ID |
| | SELECTED FILE ID | | |

FIG.6
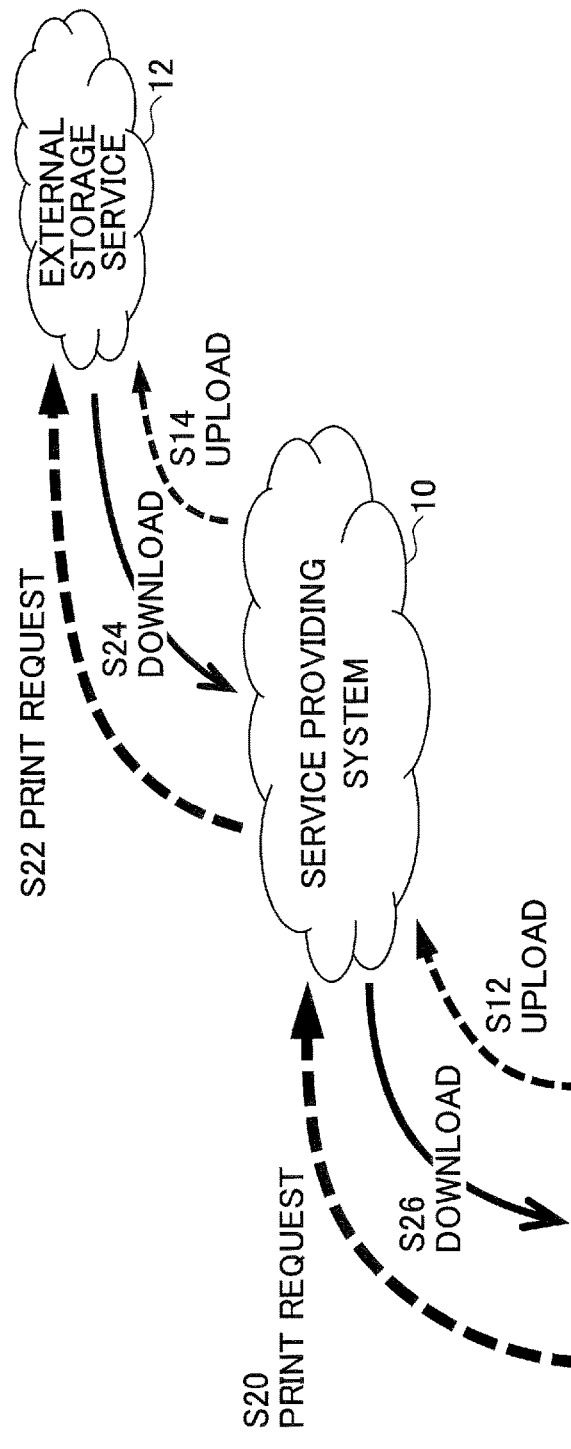
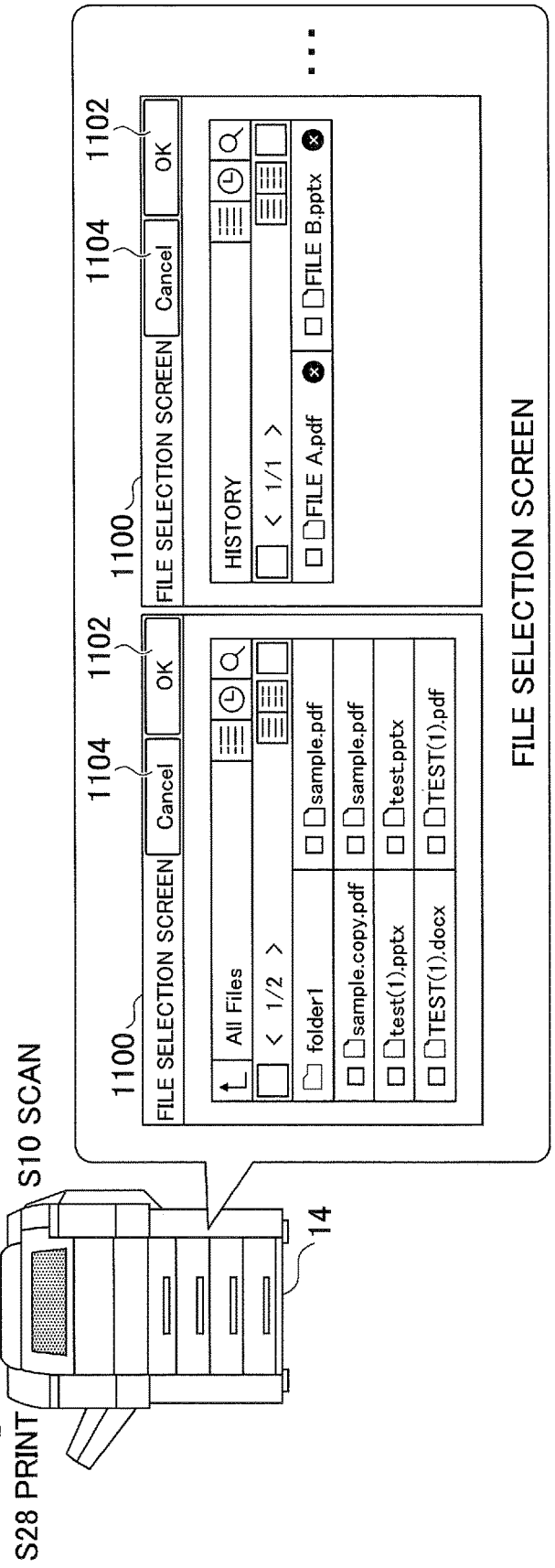

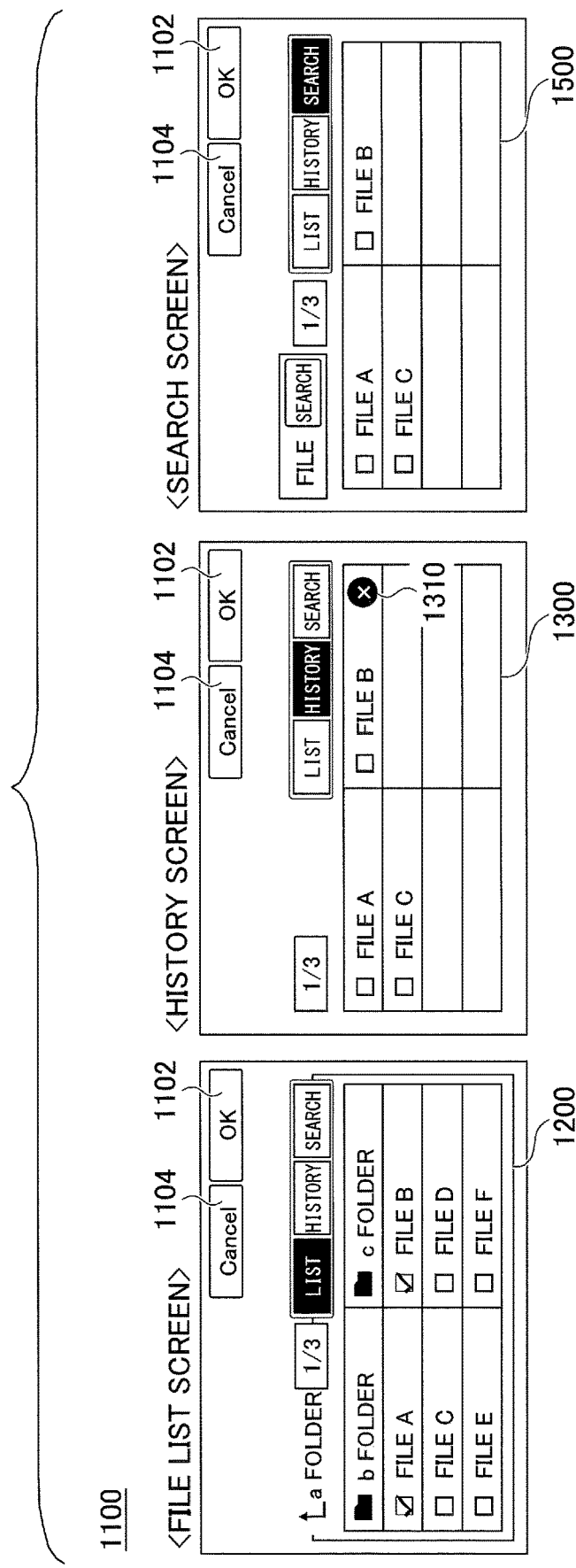

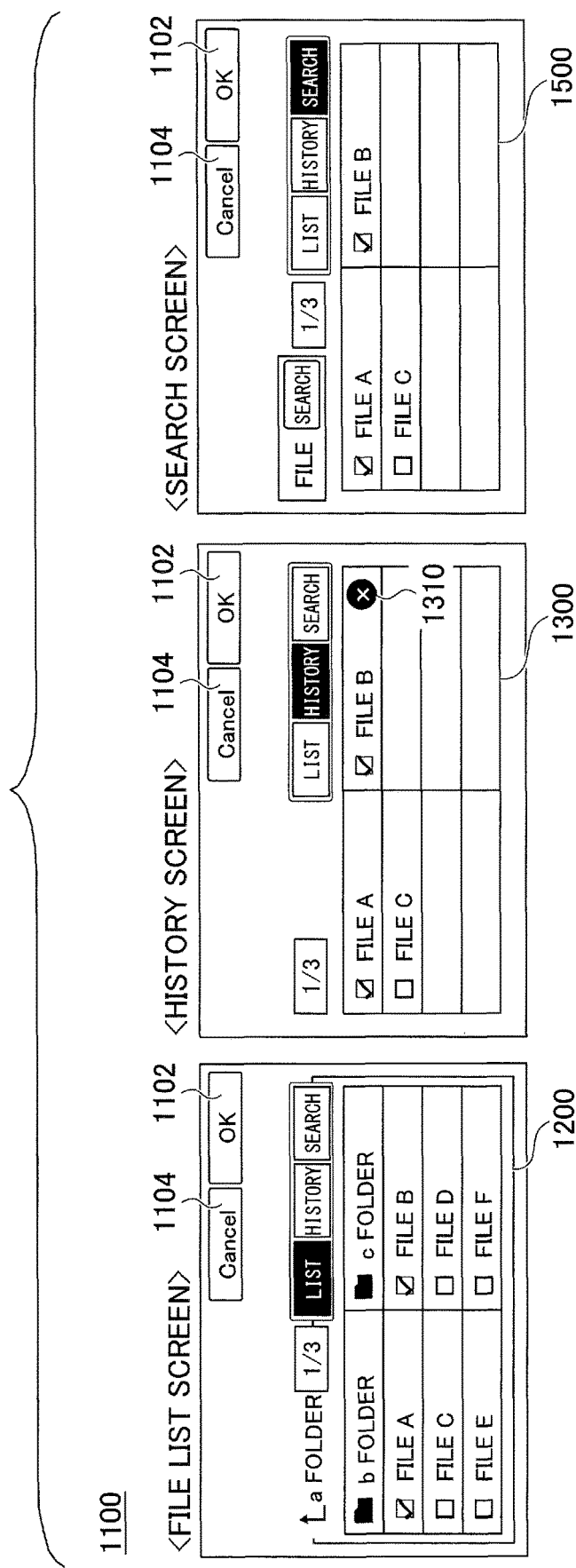

INFORMATION PROCESSING SYSTEM, INFORMATION PROCESSING TERMINAL, AND INFORMATION PROCESSING METHOD

CROSS-REFERENCE TO RELATED APPLICATION

The present application is based on and claims priority under 35 U.S.C. § 119 to Japanese Patent Application No. 2018-181064, filed on Sep. 26, 2018, the contents of which are incorporated herein by reference in their entirety.

BACKGROUND OF THE INVENTION

1. Field of the Invention

The present invention relates to an information processing system, an information processing terminal, and an information processing method.

2. Description of the Related Art

For example, there is a generally known method performed in cases where a user interface (hereinafter referred to as a "UI") prompts a user to select some kind of data, in which the user is prompted to select data from a list of data stored in a storage, etc., or to select data from history of data selected by the user previously.

There is known a technique of the related art, in which history data of executed functions is stored, so that in a mobile phone terminal that prompts a user to select history data through a UI, a protection setting is made to protect the history data specified by the user from being subjected to a deletion process (see, e.g., Patent Document 1).

Patent Document 1: Japanese Unexamined Patent Application Publication No. 2006-109238

SUMMARY OF THE INVENTION

According to one aspect of the present invention, there is provided an information processing system in which a screen displayed by an information processing terminal transitions to another screen according to an operation by a user. The information processing system includes a screen configurator configured to generate screen data of the screen and cause the information processing terminal to display the screen, the screen being configured to accept, from the user, a selection operation of selecting a parameter, a deletion operation of deleting the parameter, a validation operation of validating the parameter selected by the selection operation, and a cancellation operation of cancelling the selection operation; and an information manager configured to manage parameter information of the parameter for which the validation operation was last accepted, by holding the parameter information in a holder. The screen configurator generates the screen data so as to reject the deletion operation of the user to delete the parameter for which the validation operation was last accepted, based on the parameter information held by the holder.

BRIEF DESCRIPTION OF THE DRAWINGS

FIG. 5 is a configuration diagram illustrating an example of file/folder information according to the first embodiment of the present invention;

FIG. 6 is an image diagram illustrating an example of cooperation between a device and an external storage service according to the first embodiment of the present invention;

FIGS. 15A and 15B are diagrams illustrating an example of a list screen, a history screen, and a search screen in which selected file information is linked/not linked according to a second embodiment of the present invention;

DETAILED DESCRIPTION OF THE PREFERRED EMBODIMENTS

For example, on the UI, there are cases where an operation by the user is accepted to cancel the user's present selection of data and to return to the original data selection. Further, there are cases where an operation by the user is accepted to delete data from the history or from the search results, before accepting the operation to cancel the user's present selection of data and to return to the original data selection. However, depending on the data (parameter) deleted from the history or the search results, there have been cases where it is not possible to cancel the user's present selection of data and to return to the original parameter selection.

A problem to be addressed by an embodiment of the present invention is to provide an information processing system that prevents a situation where it is not possible to return to the original parameter selection by a cancellation operation.

Hereinafter, embodiments of the present invention will be described in detail with reference to the drawings.

First Embodiment

<System Configuration of First Embodiment>

Figure 1:
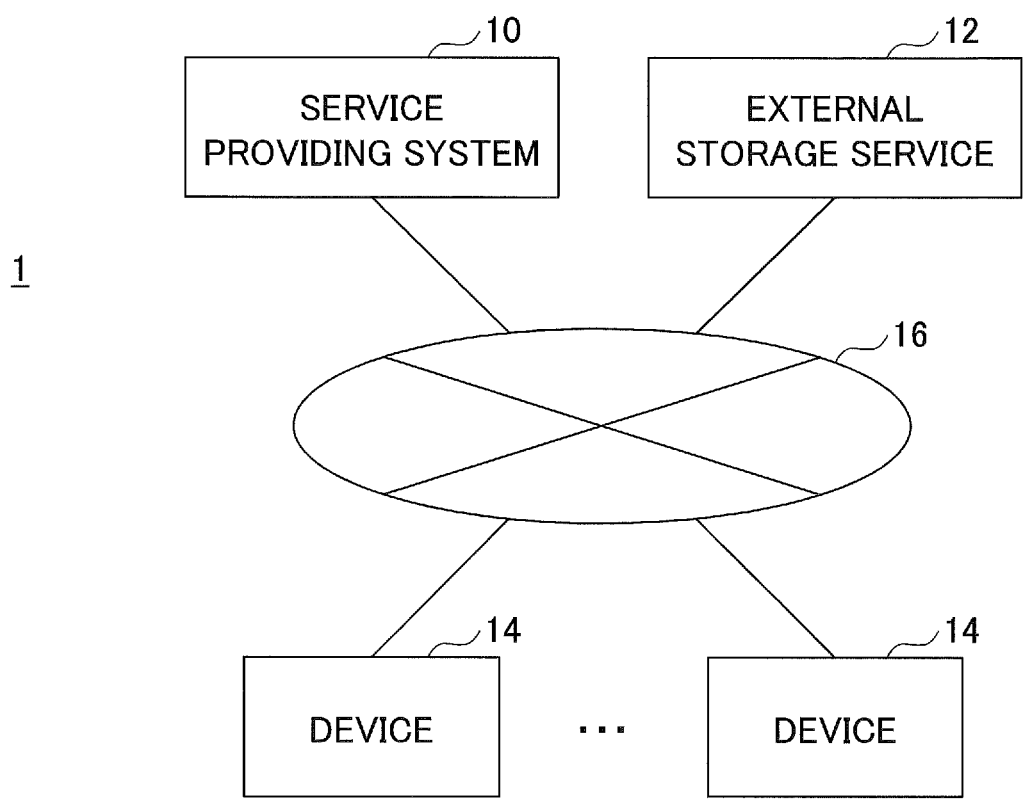
FIG. 1 is a configuration diagram illustrating an example of an information processing system according to a first embodiment of the present invention.

First, a system configuration of the information processing system 1 according to the present embodiment will be described with reference to FIG. 1. FIG. 1 is a configuration diagram illustrating an example of an information processing system according to the present embodiment. An information processing system 1 illustrated in FIG. 1 includes a service providing system 10, an external storage service 12, and one or more devices 14, which are communicatively connected to each other via a wide area network 16, such as the Internet.

The service providing system 10 is implemented by one or more information processing apparatuses, and the service providing system 10 provides a variety of services through the network 16. Examples of services provided by the service providing system 10 according to the present embodiment will be described below.

The external storage service 12 is a computer system that provides a service referred to as online storage, via the network 16. The external storage service 12 lends storage areas for storage. In the present embodiment, the storage area lent by the external storage service 12 is a storage area of folders/files.

The device 14 is an example of an information processing terminal operated by a user. The device 14 may be, for example, an image forming apparatus. The image forming apparatus is a Multifunction Peripheral (MFP), a printer, a scanner, or a facsimile machine, etc. The device 14 is not limited to an image forming apparatus, as long as the device 14 is an electronic device that includes a display function and that accepts an operation of selecting some kind of a parameter such as a file from a user. The device 14 may be a projector, an interactive white board, a digital signage, a head-up display, an industrial machine, an imaging apparatus, a sound correcting apparatus, a medical device, a network home appliance, and the like.

The device 14 may also be a personal computer, a mobile phone, a smartphone, a tablet terminal, a game machine, a mobile information terminal, a digital camera, or the like. An interactive white board is an electronic device that has an electronic blackboard function that can communicate with other devices. A digital signage is an example of an output device. The user may operate the device 14 to use various services provided by the service providing system 10.

The configuration of the information processing system 1 illustrated in FIG. 1 is an example. For example, the service providing system 10 may use a storage area for folders/files other than the external storage service 12. The service providing system 10 may also be implemented by being divided into a plurality of computer systems.

Hardware Configuration of First Embodiment

<<Computer>>

Figure 2:
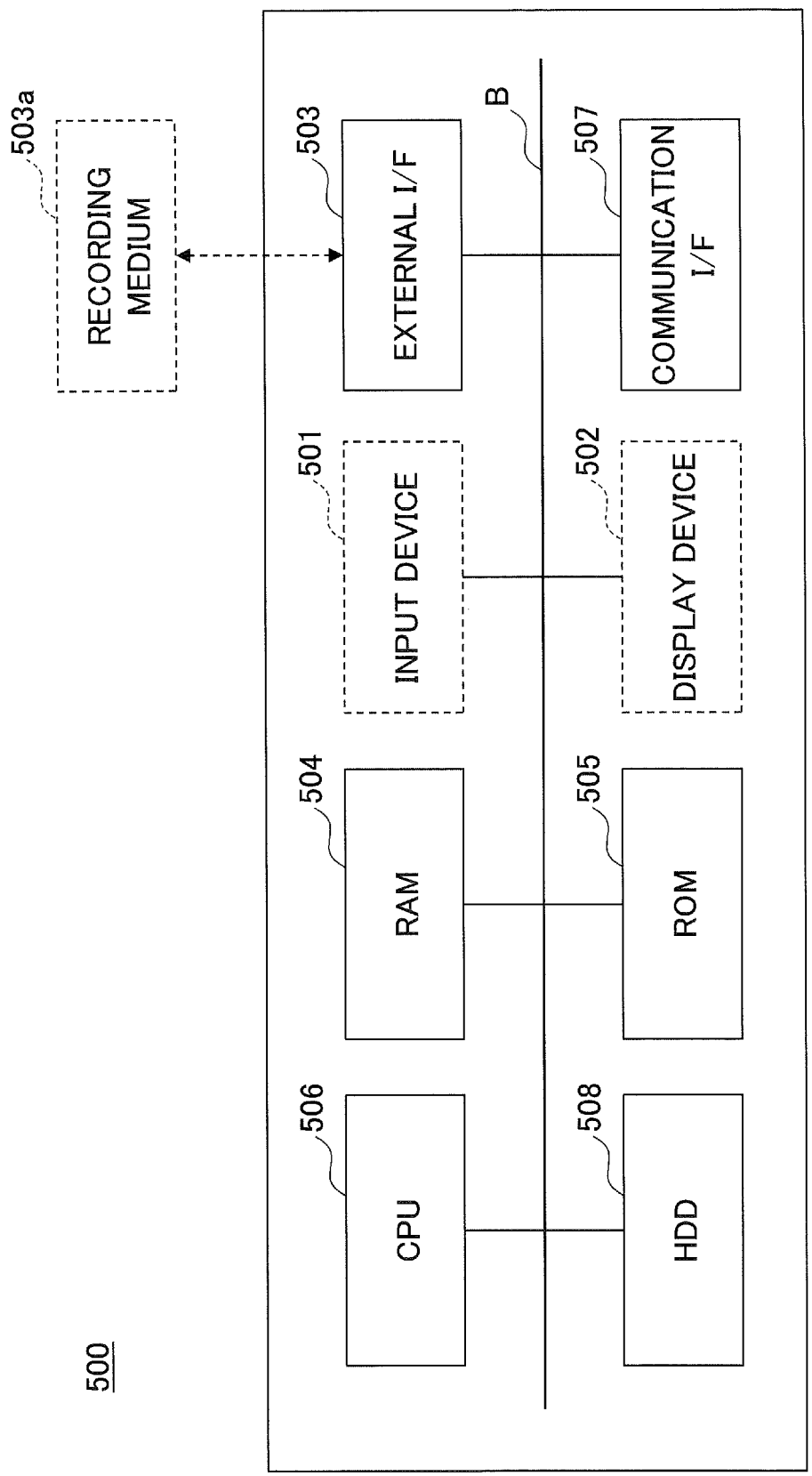
FIG. 2 is a hardware configuration diagram illustrating an example of a computer according to the first embodiment of the present invention.

The service providing system 10 and the external storage service 12 may be implemented, for example, by a computer having a hardware configuration illustrated in FIG. 2. Also, when the device 14 is a personal computer or the like, the device 14 is implemented by the hardware configuration illustrated in FIG. 2. FIG. 2 is a hardware configuration diagram of an example of a computer according to the present embodiment.

A computer 500 of FIG. 2 includes an input device 501, a display device 502, an external interface (I/F) 503, a Random Access Memory (RAM) 504, a Read-Only Memory (ROM) 505, a Central Processing Unit (CPU) 506, a communication I/F 507, and a hard disk drive (HDD) 508, which are connected to each other by a bus B. The input device 501 and the display device 502 may have a mode of being connected and used when necessary.

The input device 501 includes a keyboard, a mouse, a touch panel, or the like, and is used by the user to input operation signals. The display device 502 includes a display or the like to display the results of processing by the computer 500.

The communication I/F 507 is an interface that connects the computer 500 to various networks. Thus, the computer 500 can perform data communication via the communication I/F 507.

The HDD 508 is an example of a non-volatile storage device that stores programs and data. The stored programs and data include an operating system (OS), which is the basic software for controlling the entire computer 500, and programs that provide various functions on the OS. The computer 500 may use a drive device (e.g., a solid state drive: SSD) that uses a flash memory as a storage medium instead of the HDD 508.

The external I/F 503 is an interface with respect to an external device. The external device includes a recording medium 503a. Thus, the computer 500 can read and/or write data in the recording medium 503a via the external I/F 503. Examples of the recording medium 503a include a flexible disk, a Compact Disk (CD), a Digital Versatile Disk (DVD), a Secure Digital (SD) memory card, and Universal Seral Bus (USB) memory, etc.

The ROM 505 is an example of a non-volatile semiconductor memory (storage device) that can hold programs and data even after the power is turned off. The ROM 505 stores programs and data such as a basic input/output program, OS settings, and network settings executed when the computer 500 is activated. The RAM 504 is an example of a volatile semiconductor memory (storage device) that temporarily holds programs and data.

The CPU 506 is an arithmetic device that loads programs and data from a storage device such as the ROM 505 or the HDD 508 into the RAM 504 and executes processing to control and implement functions of the entire computer 500. The service providing system 10 and the external storage service 12 can implement a variety of processes as described below, for example, by the hardware configuration of the computer 500 as illustrated in FIG. 2. When the device 14 is a personal computer or the like, the device 14 can also implement a variety of processes as described below, for example, by the hardware configuration of the computer 500 as illustrated in FIG. 2.

<<Device>>

Figure 3:
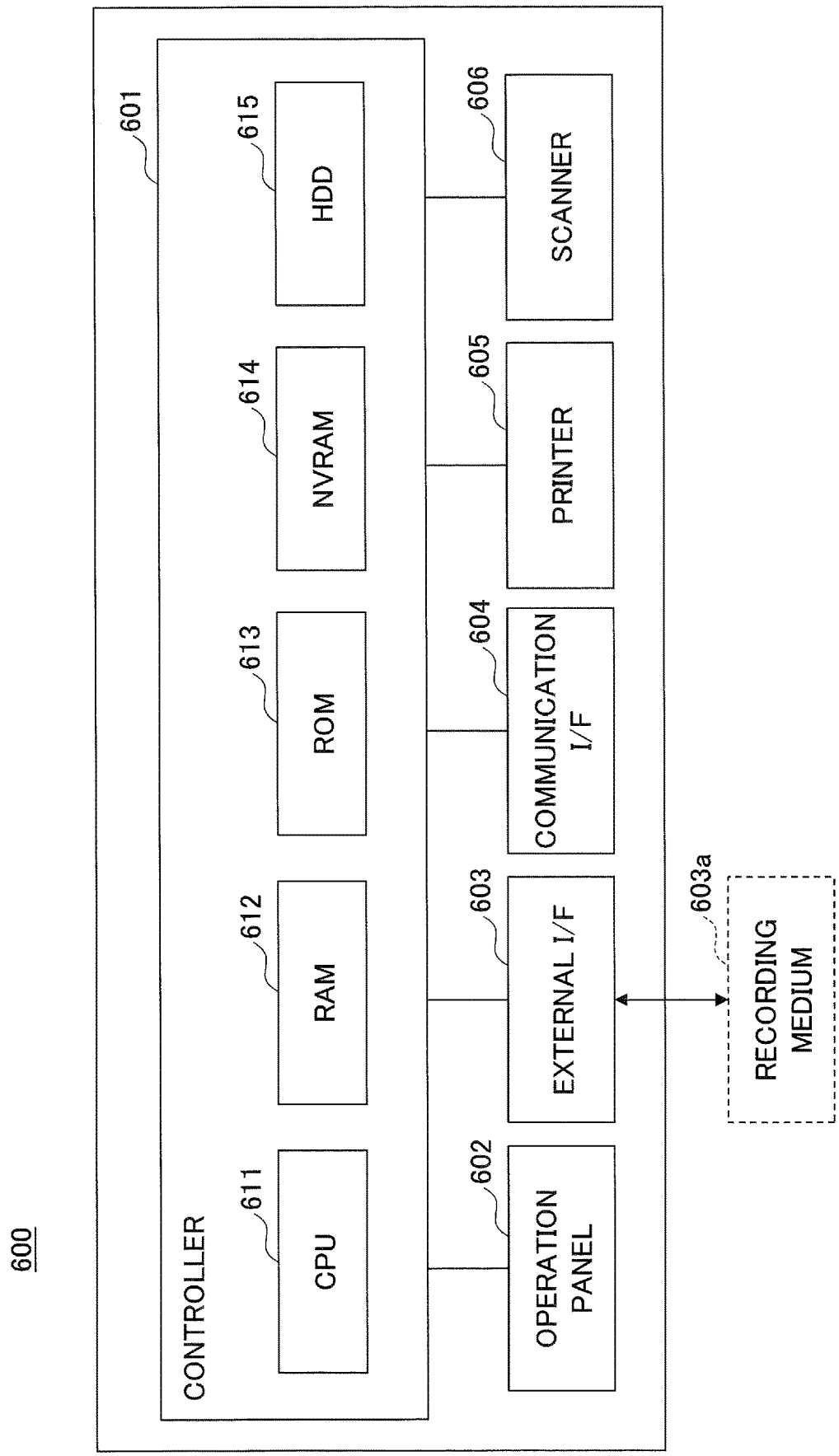
FIG. 3 is a hardware configuration diagram illustrating an example of an image forming apparatus according to the first embodiment of the present invention.

The hardware configuration in a case where the device 14 included in the information processing system 1 is an image forming apparatus, is illustrated in FIG. 3, for example. FIG. 3 is a hardware configuration diagram illustrating an example of an image forming apparatus according to the present embodiment. An image forming apparatus 600 illustrated in FIG. 3 includes a controller 601, an operation panel 602, an external I/F 603, a communication I/F 604, a printer 605, a scanner 606, and the like.

The controller 601 includes a CPU 611, a RAM 612, a ROM 613, a non-volatile RAM (NVRAM) 614, and a HDD 615. The ROM 613 stores various types of programs and data. The RAM 612 temporarily holds programs and data. The NVRAM 614 stores, for example, configuration information. Further, the HDD 615 stores various types of programs and data.

The CPU 611 loads programs, data, setting information, etc., from the ROM 613, the NVRAM 614, the HDD 615, etc., into the RAM 612, and executes processing, thereby controlling and implementing functions of the entire image forming apparatus 600.

The operation panel 602 includes an input unit that accepts input from a user and a display unit that displays information. The external I/F 603 is an interface with respect to an external device. The external device includes a recording medium 603a, etc. Accordingly, the image forming apparatus 600 can read and/or write data in the recording medium 603a via the external I/F 603. The recording medium 603a includes an integrated circuit (IC) card, a flexible disk, a CD, a DVD, an SD memory card, a USB memory, and the like.

The communication I/F 604 is an interface for connecting the image forming apparatus 600 to the network 16. Accordingly, the image forming apparatus 600 can perform data communication via the communication I/F 604. The printer 605 is a printing device for printing print data on a conveyed object. For example, the conveyed object is not limited to paper, that is, the conveyed object may be paper, coated paper, cardboard, an overhead projector (OHP) film, a plastic film, prepreg, copper foil, and so forth. The scanner 606 is a reading device for reading image data (electronic data) from an original document.

Function Configuration of First Embodiment

Figure 4:
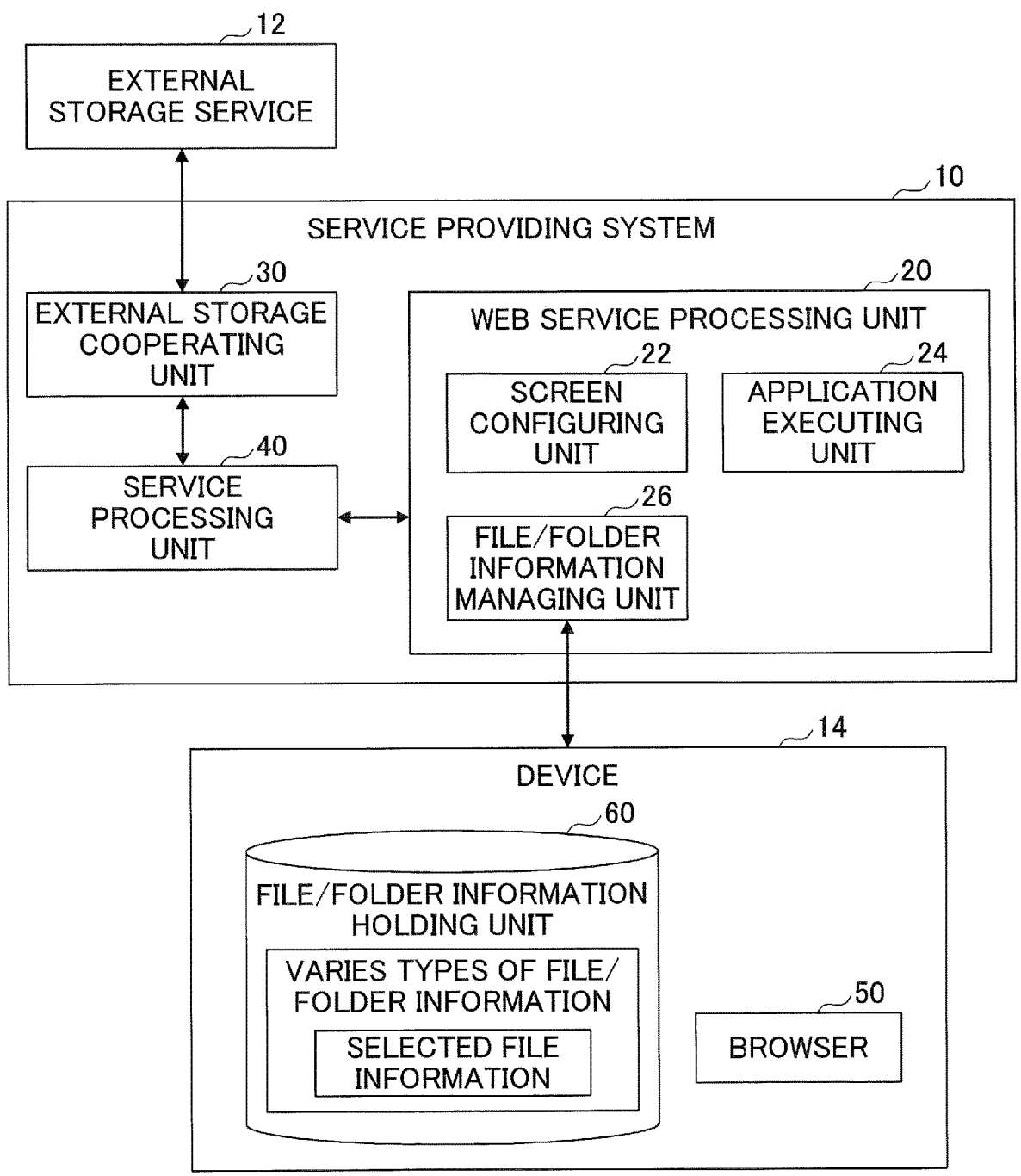
FIG. 4 is a diagram illustrating the functional configuration of an example of the information processing system according to the first embodiment of the present invention.

FIG. 4 is a diagram illustrating the functional configuration of an example of the information processing system according to the present embodiment. The device 14 illustrated in FIG. 4 is equipped with a browser 50. The user of the device 14 uses the service providing system 10 from the browser 50 to display a file selection screen, etc., which will be described later. The device 14 includes a file/folder information holding unit 60. The file/folder information holding unit 60 holds various types of file/folder information described later. Further, the various types of file/folder information include selected file information. The selected file information is information of a file that is currently selected by a user's operation.

The service providing system 10 of FIG. 4 includes a web service processing unit 20, an external storage cooperating unit 30, and a service processing unit 40. Each of these functional units is implemented by a process that the CPU 506 is caused to execute by one or more programs installed in the service providing system 10.

The web service processing unit 20 performs processing for a user to use various services by using the browser 50 of the device 14. The web service processing unit 20 includes a screen configuring unit 22, an application executing unit 24, and a file/folder information managing unit 26.

The screen configuring unit 22 constructs a screen (generates screen data) to be displayed on the browser 50 of the device 14. Thus, the browser 50 of the device 14 displays a screen for using a service provided by the service providing system 10. The application executing unit 24 transmits a request to execute various services to the service processing unit 40 in response to a request from the browser 50 of the device 14.

The file/folder information managing unit 26 manages the file/folder information held by the file/folder information holding unit 60, and applies the user's operation, such as selecting a file or deleting history, to the file/folder information. The external storage cooperating unit 30 makes various requests to the external storage service 12, such as referring to a file list or downloading or uploading files. The service processing unit 40 performs processing related to the service provided by the service providing system 10. The web service processing unit 20, the external storage cooperating unit 30, and the service processing unit 40 may be respectively implemented by different computers 500.

Various types of file/folder information held by the file/folder information holding unit 60 are configured, for example, as illustrated in FIG. 5. FIG. 5 is a configuration diagram of an example of file/folder information. The file/folder information illustrated in FIG. 5 is stored for each screen such as a folder list screen, a file list screen, a history screen, a search screen, etc.

The file/folder information in the folder list screen indicated in FIG. 5 includes the items of "currently selected folder ID, folder name", "entry in currently selected folder", "folder ID, folder name of parent folder", and "page number".

The file/folder information in the file list screen indicated in FIG. 5 includes the items of "currently selected folder ID, folder name", "entry in currently selected folder", "folder ID, folder name of parent folder", "page number", and "selected file ID".

The file/folder information in the history screen indicated in FIG. 5 includes the items of "entry in history" and "selected file ID". The file/folder information in the search screen indicated in FIG. 5 includes the items of "search keyword", "search result", "page number", and "selected file ID".

The item "entry in currently selected folder" is information of the file included in the currently selected folder. The item "entry in history" is information of the file in the history displayed on the history screen. The item "search result" is the information of a file that is found as a result of searching files with the keywords in the item "search keyword". Further, the item "page number" of each screen represents the displayed page, when information of a file included in a currently selected folder or information of a file searched by a keyword, is displayed upon being divided into a plurality of pages.

Further, to the item "entry in history", information of a file for which some job has been executed, is added as the information of the file in the history. The information of the file in the history added to the item "entry in history" can be deleted from the history screen by the user's operation as described below. The item "selected file ID" represents the information of the file selected (currently selected) by the user in any of the file list screen, the history screen, and the search screen.

Processing of First Embodiment

Next, the processing of the information processing system 1 according to the present embodiment will be described.
<<Cooperation of Device and External Storage Service>>

FIG. 6 is an image diagram illustrating an example of cooperation between the device and the external storage service. In the information processing system 1 according to the present embodiment, a user receives a service in which the service providing system 10, the external storage service 12, and the device 14 cooperate with each other. The information processing system 1 according to the present embodiment provides, for example, a service in which a user is prompted to select a file stored in the external storage service 12 and the file selected by the user is downloaded to the device 14 to be printed. Further, the information processing system 1 according to the present embodiment provides, for example, a service for uploading a file of a document scanned by the device 14 to a folder in the external storage service 12 selected by the user.

Steps S10 to S14 of FIG. 6 illustrate procedures of a service for uploading a file of a document that has been scanned by the device 14, to a folder of the external storage service 12 selected by the user. Steps S20 to S28 of FIG. 6 illustrate procedures of a service in which a user is prompted to select a file stored by the external storage service 12, the file selected by the user is downloaded to the device 14, and the downloaded file is printed.

The selection of the folder to be the upload destination in the external storage service 12, or the selection of the file to be downloaded from the external storage service 12 as described above is performed, for example, from a file selection screen 1100 illustrated in FIG. 6. The file selection screen 1100 of FIG. 6 is an example of a screen in which a selection of a parameter such as a folder to be the upload destination or a file to be downloaded, is accepted from the user.

The file selection screen 1100 of FIG. 6 is provided with an OK button 1102 for validating the selected parameter, and a cancel button 1104 for cancelling an operation. When the cancel button 1104 is pressed and then the file selection screen 1100 of FIG. 6 is displayed again, the screen returns to the state when the OK button 1102 was last pressed.

The file selection screen 1100 includes a list screen in which a list of files is displayed, a history screen in which a list of files in the history is displayed, or a search screen in which a list of search-found files is displayed. In the case where the cancel button 1104 is pressed in the file selection screen 1100 that includes the history screen, there is a possibility that a file, which had been selected when the OK button 1102 was last pressed, has been deleted from the files in the history by the user's operation.

When a file is deleted from the history as described above, the "entry in history" of the file/folder information of the history screen illustrated in FIG. 5 is updated. Accordingly, when the cancel button 1104 is pressed in the file selection screen 1100 that includes the history screen after deletion of a file in the history that was selected when the OK button 1102 was last pressed, the screen cannot be returned to the state when the OK button 1102 was last pressed, as described below.

Accordingly, the information processing system 1 according to the present embodiment has a mechanism for preventing a situation where the screen cannot return to the state when the OK button 1102 was last pressed, in a case where the cancel button 1104 is pressed in the file selection screen 1100 that includes the history screen.

Figure 7:
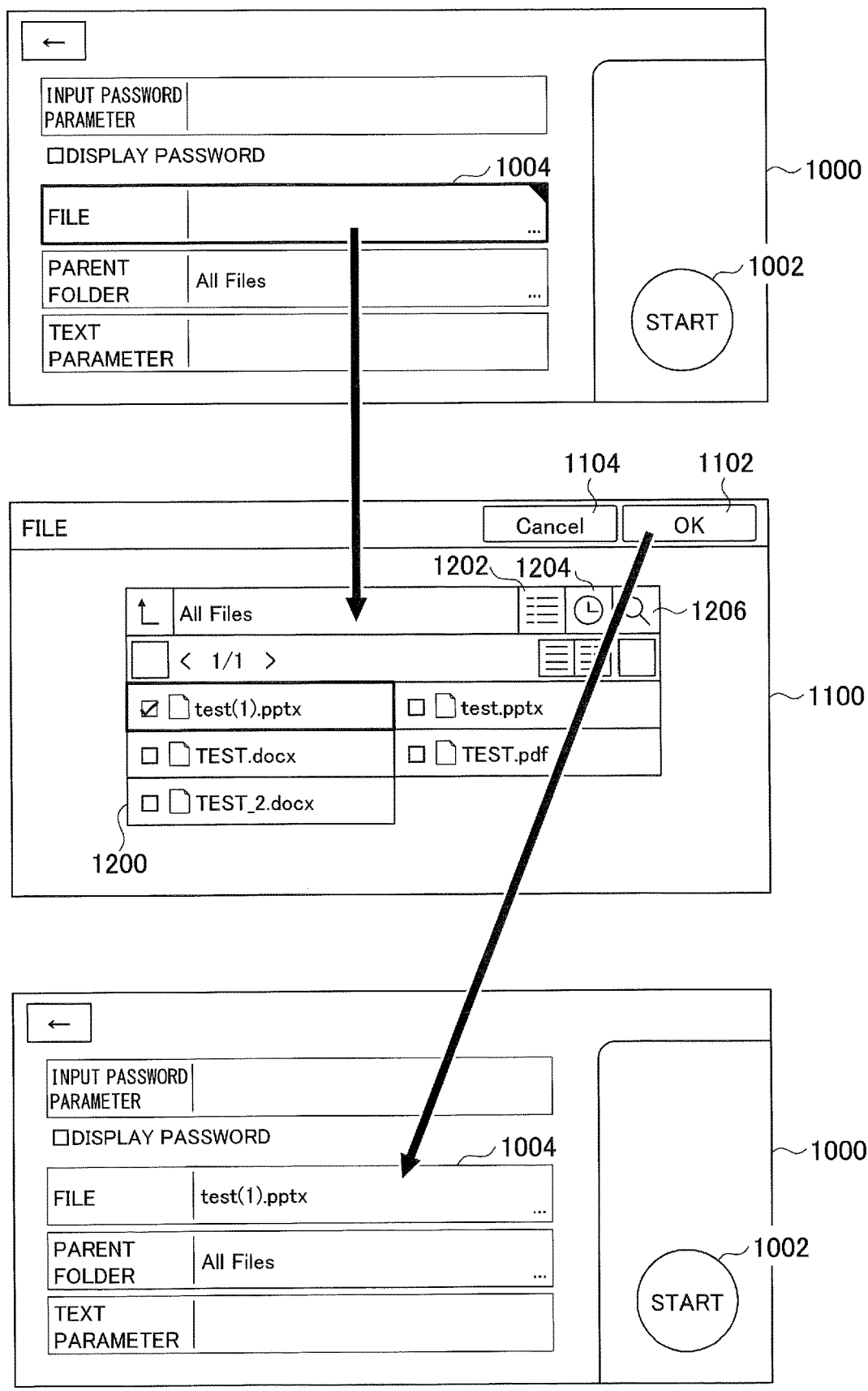
FIG. 7 is a screen transition diagram (1/2) for describing an example of using a cancel button on a list screen according to the first embodiment of the present invention.
Figure 8:
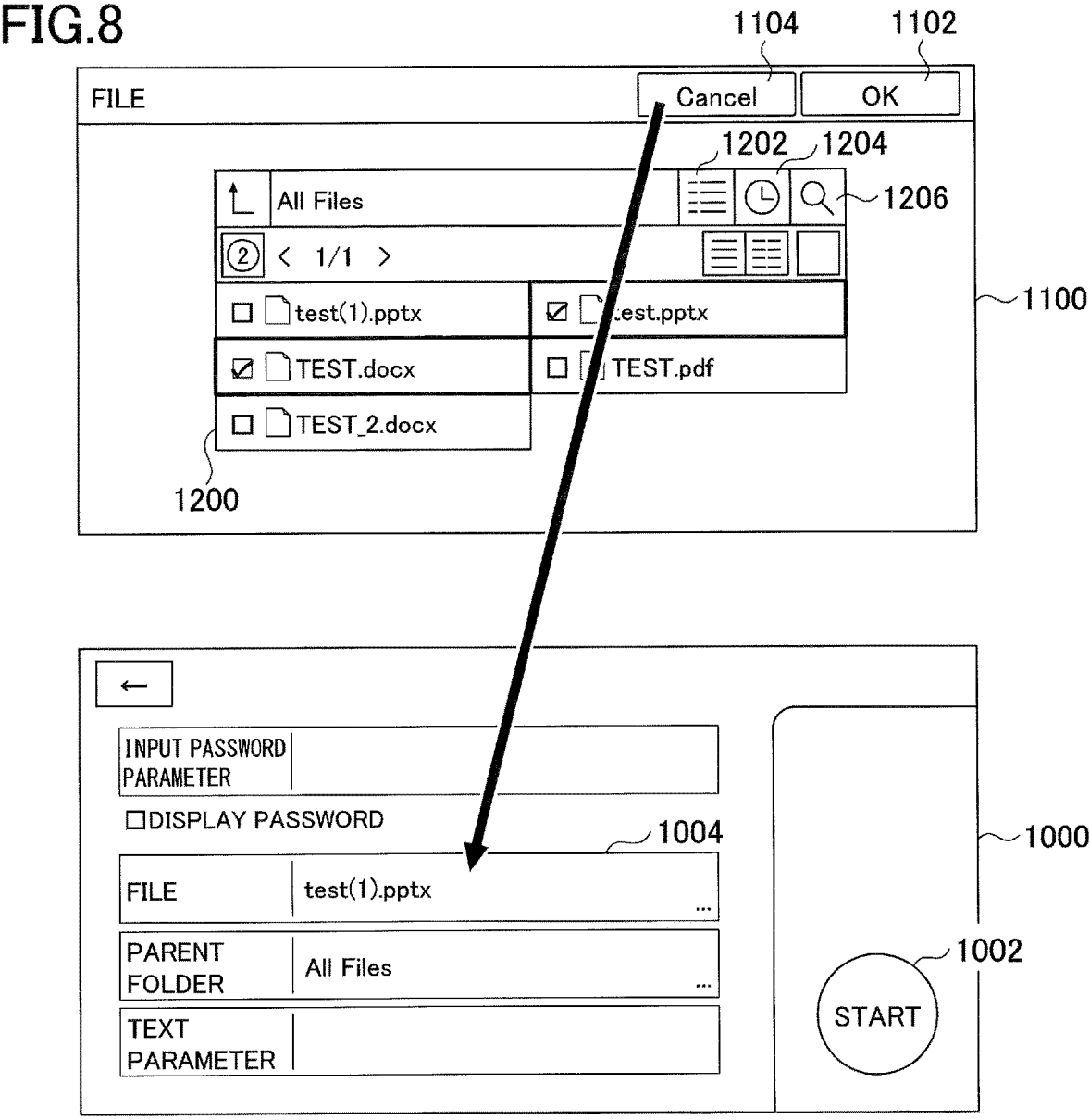
FIG. 8 is a screen transition diagram (2/2) for describing an example of using a cancel button on the list screen according to the first embodiment of the present invention.

FIGS. 7 and 8 are screen transition diagrams of an example of using the cancel button in the list screen. A top screen 1000 of the application displays various parameters that need to be set to execute a job, and a start button 1002 used by the user to instruct the execution of a job. In the top screen 1000 illustrated in FIGS. 7 and 8, when the display field for various parameters is pressed, the screen transitions to a selection screen for selecting a parameter corresponding to the display field.

FIG. 7 illustrates an example in which a file display field 1004 for a file, which is an example of a parameter, is pressed, and the screen transitions to the file selection screen 1100 including a file list screen 1200. When a history screen button 1204 is pressed, the file list screen 1200 included in the file selection screen 1100 transitions to the history screen. Further, when a search screen button 1206 is pressed, the file list screen 1200 included in the file selection screen 1100 transitions to the search screen. When a list screen button 1202 is pressed, the history screen or the search screen to which the screen has transitioned, can be returned to the file list screen 1200.

The file list screen 1200 in FIG. 7 is an example in which the OK button 1102 is pressed in a state where "test(1).pptx" is selected. The OK button 1102 is pressed by the user, and, therefore, "test(1).pptx", which is selected on the file list screen 1200, is validated, and the screen transitions to the top screen 1000. Note that in the file display field 1004 in the top screen 1000, the validated "test(1).pptx" is set. The validated "test(1).pptx" is set as the "selected file ID" in the file/folder information corresponding to the file list screen 1200.

FIG. 8 illustrates an example in which the file display field 1004 is pressed again and the screen transitions to the file selection screen 1100 including the file list screen 1200. In the file list screen 1200 of FIG. 8, the selection of "test(1).pptx" is canceled, and "test.pptx" and "TEST.docx" are newly selected.

When the screen transitions from the top screen 1000 to the file selection screen 1100, the file/folder information managing unit 26 stores a copy of the file/folder information in the file list screen held by the file/folder information holding unit 60.

When the user presses the cancel button 1104 while the file list screen 1200, as depicted in FIG. 8, is displayed, the file/folder information managing unit 26 causes the file/folder information held by the file/folder information holding unit 60, to return to the copy of the file/folder information. The OK button 1102 was last pressed at the time when the file list screen 1200 of FIG. 7 was displayed, and, therefore, in the top screen 1000 of FIG. 8, "test(1).pptx" selected in the file list screen 1200 of FIG. 7, is set in the file display field 1004.

Note that when the OK button 1102 is pressed by the user in the state of the file list screen 1200 of FIG. 8, "test.pptx" and "TEST.docx" selected in the file list screen 1200 will be validated, and the screen will transition to the top screen 1000. In the file display field 1004 in the top screen 1000, the validated "test.pptx" and "TEST.docx" will be set. The file/folder information managing unit 26 sets the validated "test.pptx" and "TEST.docx" in the "selected file ID" in the file/folder information corresponding to the file list screen 1200 held by the file/folder information holding unit 60.

Figure 9:
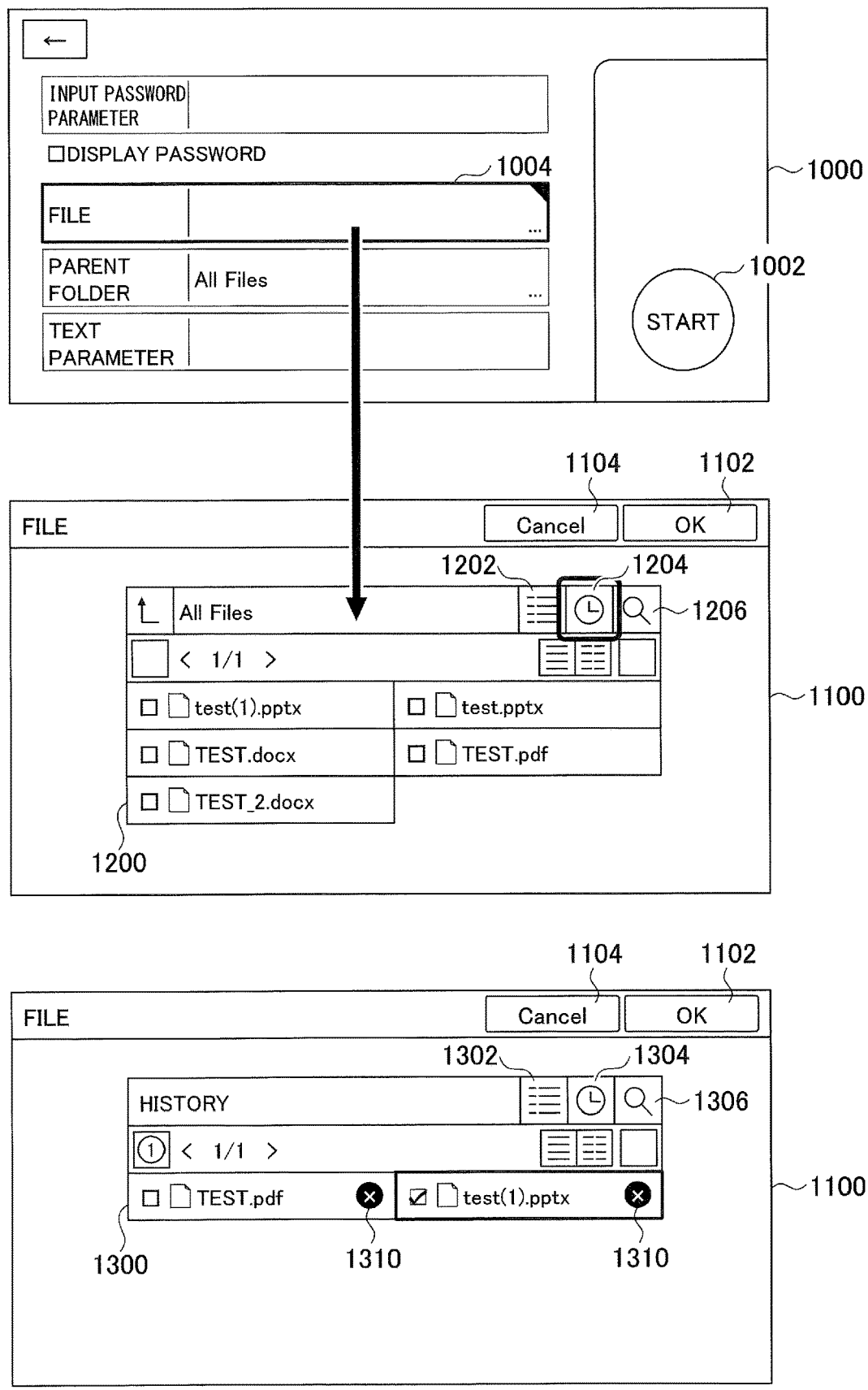
FIG. 9 is a screen transition diagram (1/3) for describing an example of using a cancel button in the history screen according to the first embodiment of the present invention.
Figure 10:
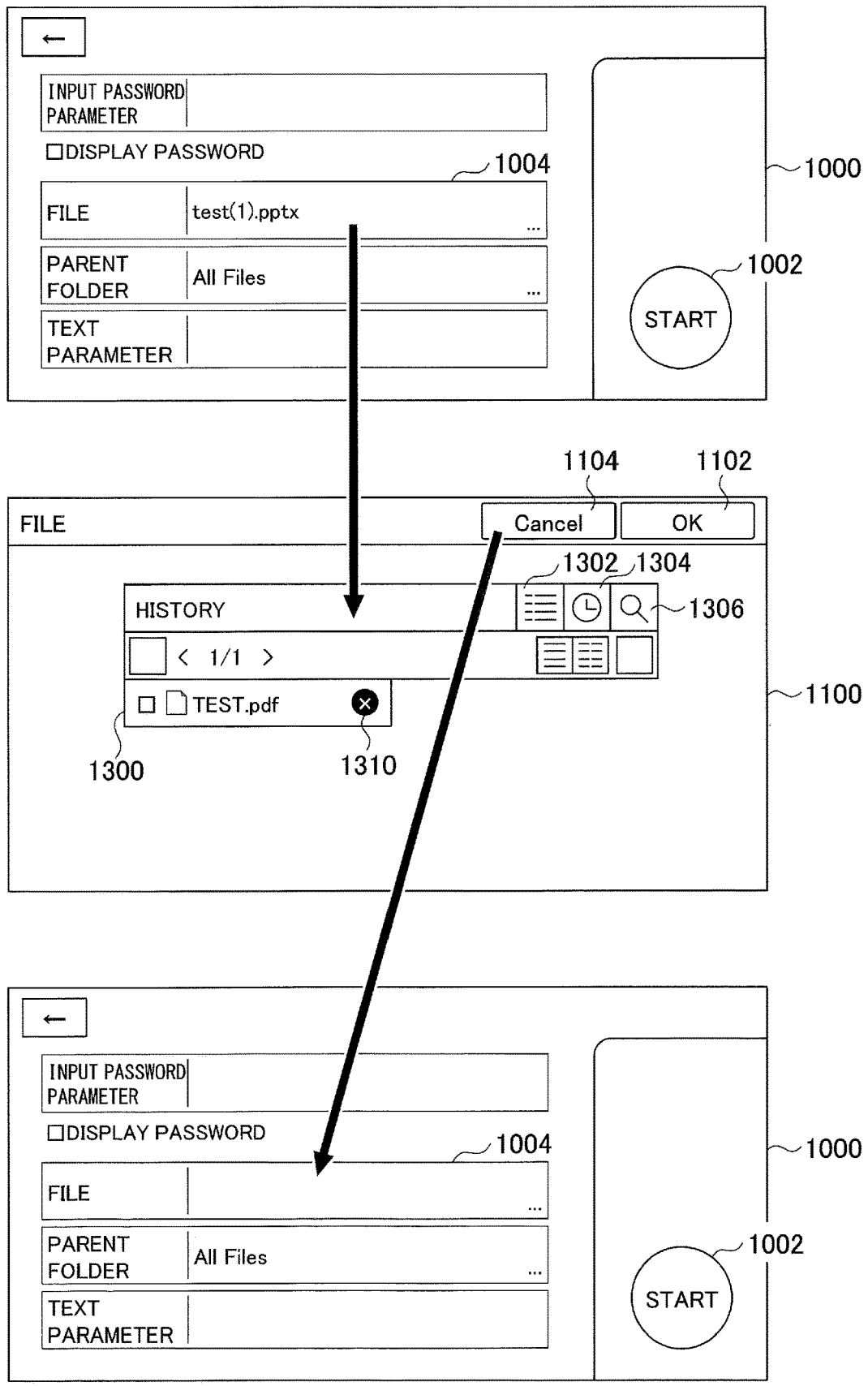
FIG. 10 is a screen transition diagram (2/3) for describing an example of using a cancel button in the history screen according to the first embodiment of the present invention.
Figure 11:
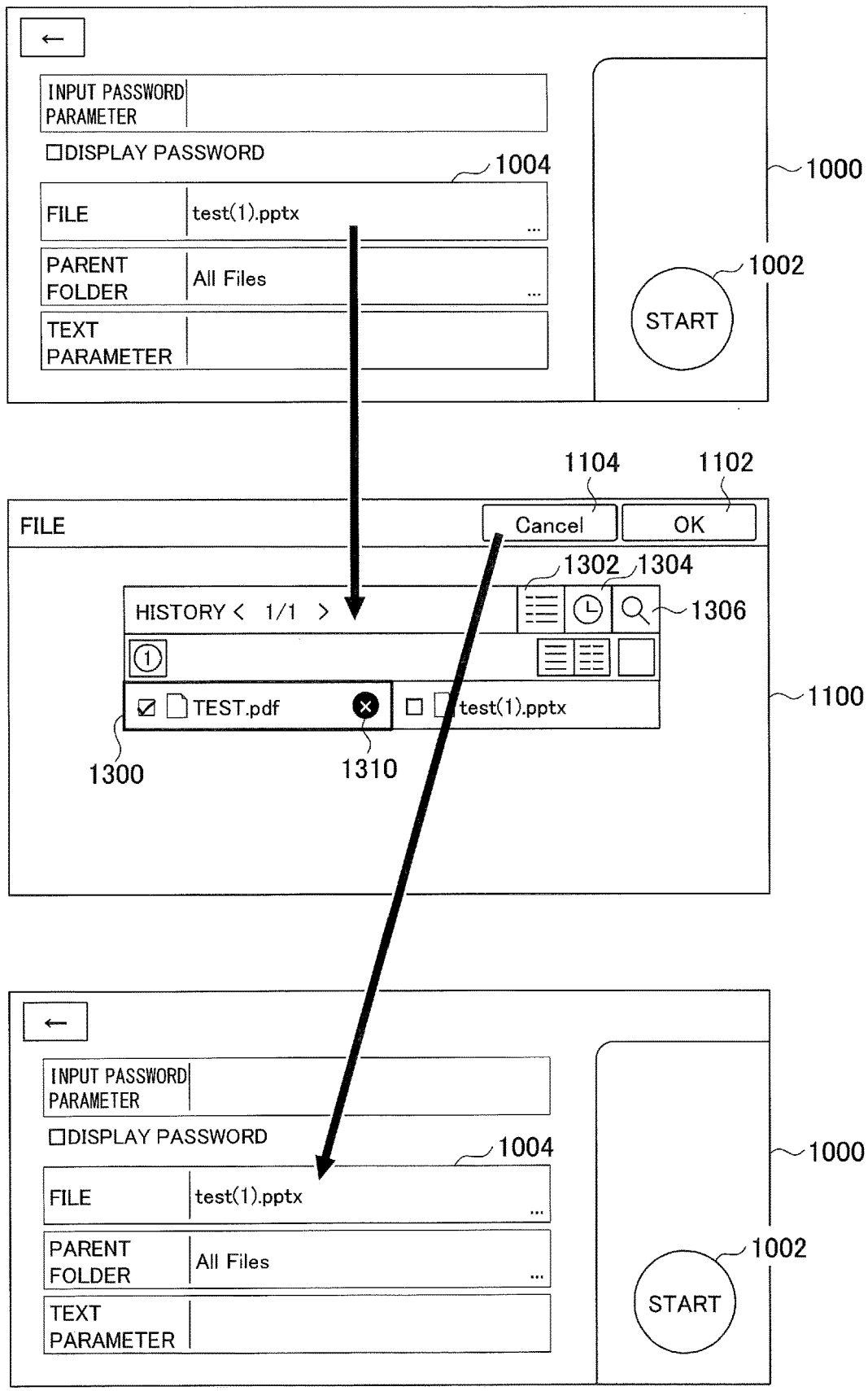
FIG. 11 is a screen transition diagram (3/3) for describing an example of using a cancel button in the history screen according to the first embodiment of the present invention.

FIGS. 9 to 11 are screen transition diagrams illustrating an example of using the cancel button in the history screen. The top screen 1000 of FIG. 9 is the same as the top screen 1000 of FIG. 7. FIG. 9 illustrates an example in which the file display field 1004 is pressed and screen transitions to the file selection screen 1100 including the file list screen 1200. Further, FIG. 9 illustrates an example in which the history screen button 1204 is pressed and the screen transitions to the file selection screen 1100 including a history screen 1300.

The history screen 1300 included in the file selection screen 1100 transitions to the file list screen 1200 by pressing a list screen button 1302. Further, the history screen 1300 included in the file selection screen 1100 transitions to the search screen by pressing a search screen button 1306. By pressing a history screen button 1304, the file list screen 1200 or the search screen to which the screen has transitioned, can be returned to the history screen 1300.

In the history screen 1300 of FIG. 9, the files in the history, i.e., "TEST.pdf" and "test(1).pptx" are displayed, and a delete button 1310 for deleting each file from the history is displayed for the corresponding file. By pressing the delete button 1310 in the history screen 1300, the user can delete a file in the history corresponding to the pressed delete button 1310.

Further, the history screen 1300 of FIG. 9 illustrates a state where the file in the history "test(1).pptx" is selected. As the user presses the OK button 1102 in the state illustrated in FIG. 9, "test(1).pptx" selected on the history screen 1300 is validated, and the screen transitions to the top screen 1000 illustrated in FIG. 10. In the file display field 1004 in the top screen 1000 of FIG. 10, the validated "test(1).pptx" is set. In the "selected file ID" in the file/folder information corresponding to the history screen 1300, the validated "test(1).pptx" is set.

FIG. 10 illustrates an example in which the file display field 1004 is pressed again, and the screen transitions to the file selection screen 1100 including the history screen 1300. The history screen 1300 in FIG. 10 illustrates a state in which "test(1).pptx", which is the file in the history that was previously selected, is deleted, and the cancel button 1104 is pressed. When transitioning from the top screen 1000 to the file selection screen 1100, the file/folder information managing unit 26 holds a copy of the file/folder information of the file list screen held by the file/folder information holding unit 60.

When the file in the history "test(1).pptx" is deleted by the user in the history screen 1300 of FIG. 10, the file "test(1).pptx", which has been set in the "selected file ID" of the file/folder information corresponding to the history screen 1300, is also deleted from the entries in the history.

For this reason, after the cancel button 1104 is pressed by the user in the state of the history screen 1300 illustrated in FIG. 10, when the file display field 1004 is pressed again, the file in the history "test(1).pptx" will not be included in the history screen 1300 that is displayed. Thus, when the cancel button 1104 is pressed by the user in the state of the history screen 1300 of FIG. 10, the file "test(1).pptx" that was included when the OK button 1102 was last pressed, will not be included in the history, and the intended specification of the cancel button 1104 is not satisfied. In the history screen 1300 of FIG. 10, with respect a file other than the file in the history previously selected, even if this file is deleted by the delete button 1310 and then the file display field 1004 is pressed again, the above problem will not arise.

Accordingly, the information processing system 1 according to the present embodiment has a mechanism as illustrated in the history screen 1300 of FIG. 11, in which a file selected when the OK button 1102 was last pressed cannot be deleted from the history. In the history screen 1300 of FIG. 11, the delete button 1310, corresponding to "test(1).pptx" selected when the OK button 1102 was last pressed, is not displayed, so that "test(1).pptx" cannot be deleted from the history.

Therefore, in the history screen 1300 of FIG. 11, the file "test(1).pptx" will not be deleted from the history, while the selection of "test(1).pptx" is cancelled and "TEST.docx" is newly selected and the cancel button 1104 is pressed. Accordingly, in the history screen 1300 of FIG. 11, it is possible to return to the history screen 1300 in which the intended specification of the cancel button 1104 is satisfied.

Figure 12:
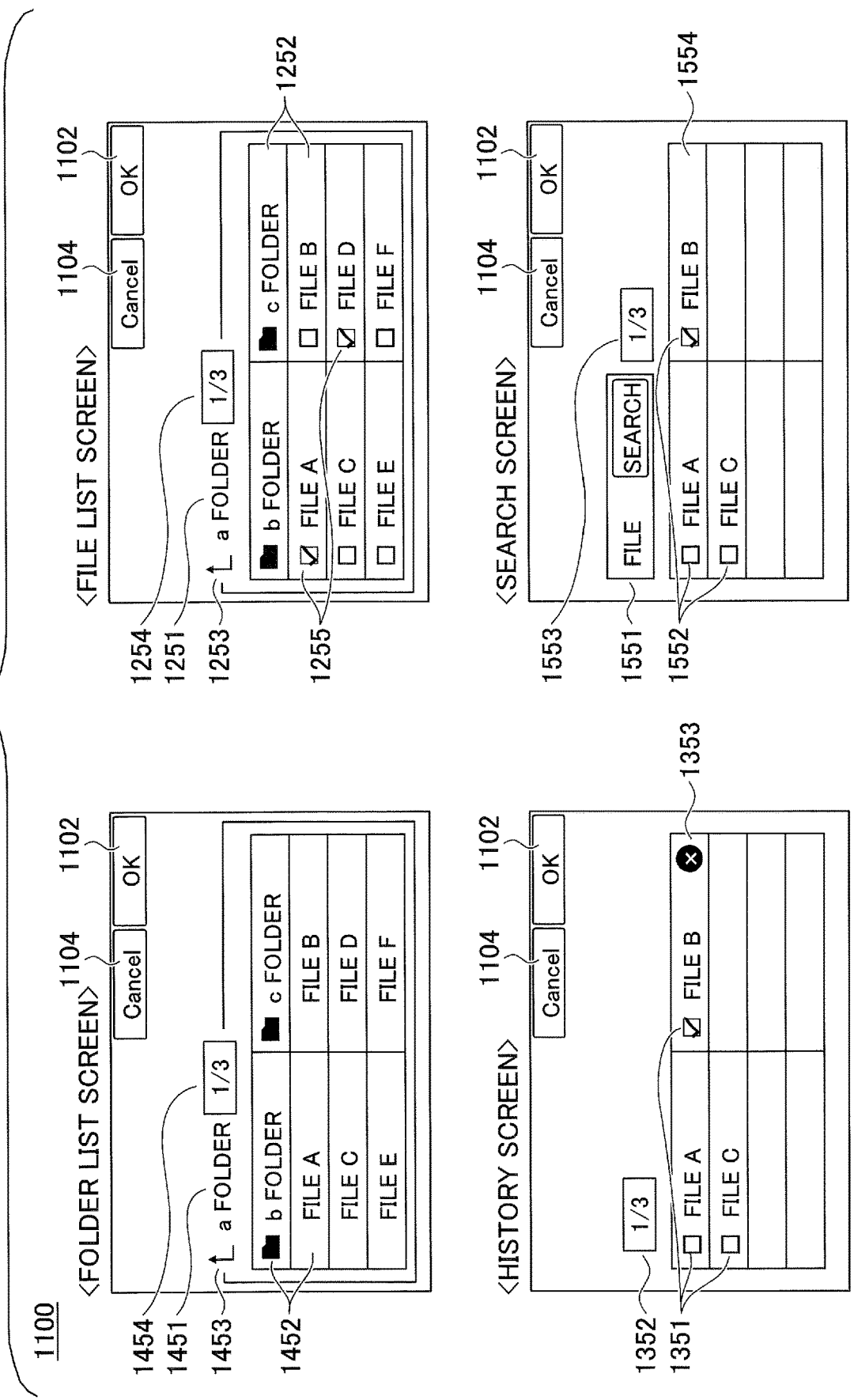
FIG. 12 is an example illustrating a relationship between file/folder information and a file selection screen according to the first embodiment of the present invention.

FIG. 12 is an example illustrating the relationship between the file/folder information and the file selection screen. In FIG. 12, the file selection screen 1100 is schematically illustrated. The file/folder information managing unit 26 stores the initial folder acquisition state when the file selection screen 1100 is activated.

When the screen configuring unit 22 receives the pressing of the OK button 1102, the file/folder information is saved as illustrated in FIG. 5 according to the displayed file selection screen 1100. As illustrated in FIG. 5, the items to be held are different for the folder list screen, the file list screen, the history screen, and the search screen.

This is because when the cancel button 1104 is pressed by the user, the items that need to be called to return to the previous state are different. That is, in a case where a parameter was validated in the folder list screen at the previous time of validating the parameter (i.e., when the OK button 1102 was pressed), after the cancel button 1104 is pressed, the screen will return to the state of the folder list screen.

Accordingly, even when a user performs an incorrect operation or an unintended operation, for example, by pressing the cancel button 1104, it is possible to return to the state when the parameter was validated previously. In the information processing system 1 according to the present embodiment, while the device 14 or the external storage cooperating unit 30 is acquiring folder/file information from the external storage service 12 or is searching for a file, for example, the cancel button 1104 may be displayed in a half brightness state so that the cancel button 1104 cannot be pressed.

In the folder list screen, the parameter to be selected is a folder, and, therefore, it is necessary to store a currently selected folder 1451. Also, in order to return to the state when the parameter was previously validated when the cancel button 1104 is pressed, it is necessary to store entries 1452 in the selected folder, information on a parent folder 1453, and a page number 1454.

In the file list screen, in addition to the information to be stored for the folder list screen, a currently selected file 1255 is stored in the item "selected file ID". In the file list screen illustrated in FIG. 12, a file with a tick mark is the currently selected file. The same applies to the history screen and the search screen of FIG. 12. Further, with respect to the history screen and the search screen of FIG. 12, examples of a history screen and a search screen of files are stored; however, the same applies to a history screen and a search screen of folders.

Figure 13:
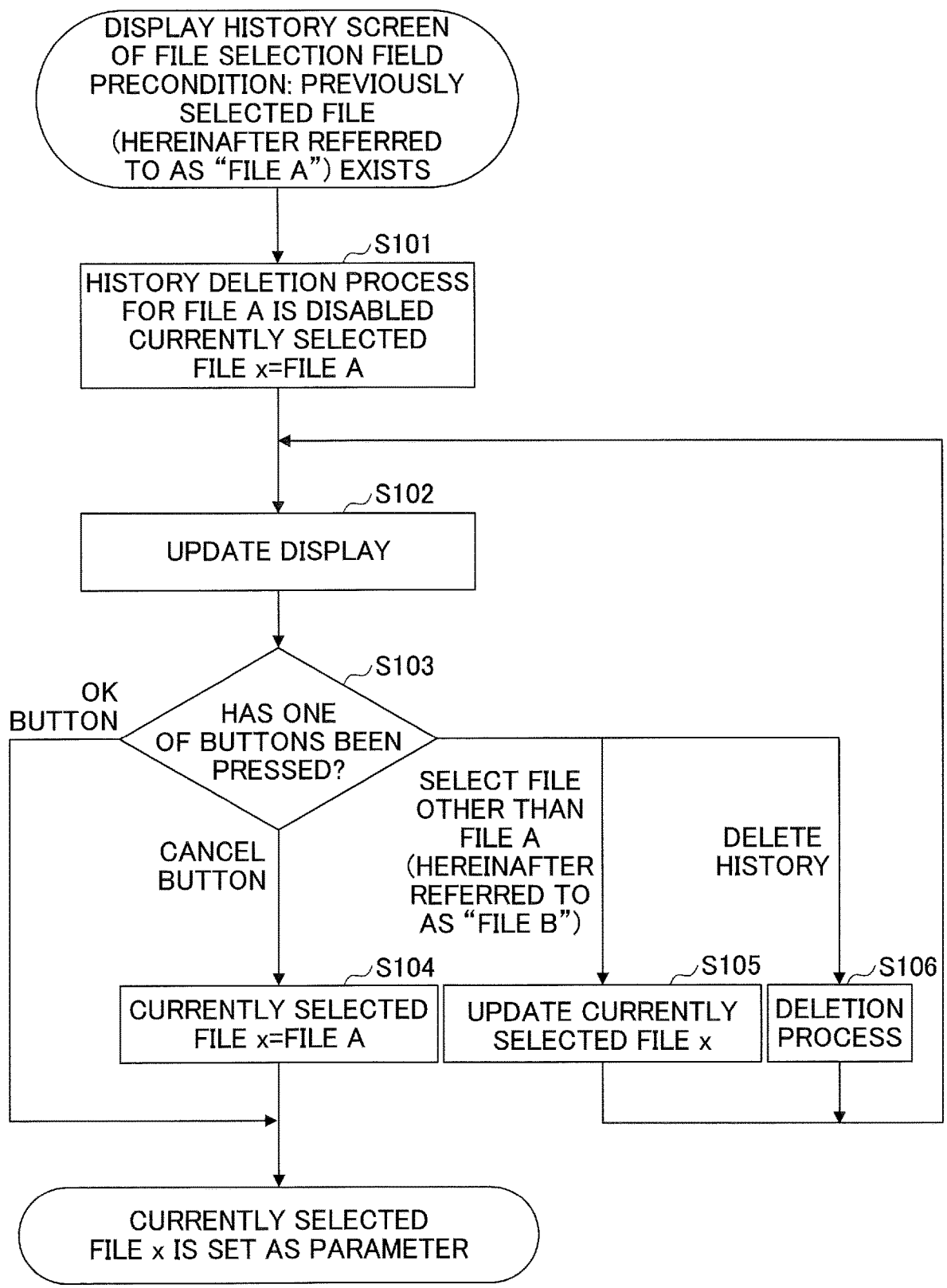
FIG. 13 is a flow chart illustrating an example of a selection file determination process in a history screen according to the first embodiment of the present invention.

FIG. 13 is a flowchart illustrating an example of a selection file determination process in the history screen. In the flowchart illustrated in FIG. 13, it is assumed that the file selection screen 1100 including the history screen 1300 is displayed, and the precondition is that a previously selected file (hereinafter referred to as "file A") exists.

In a case where the history entry can be deleted, when the user deletes the history entry of the previously selected file A from the history screen 1300, as described above, it will not be possible to return to the state of the screen when the OK button 1102 was last pressed (the original state).

Accordingly, in step S101, the screen configuring unit 22 disables the deletion of the history entry of file A, based on the selected file information (the "selected file ID" in the history screen 1300 representing the previously selected file). An example of a state in which deletion is disabled, is a state in which the delete button 1310 is not displayed. Further, an example of a state in which deletion is disabled may be a state where a dialog indicating that deletion is disabled is displayed, when the delete button 1310 is pressed. The currently selected file x in the history screen 1300 is assumed to be file A.

In step S102, the display is updated based on a user operation. In step S103, the screen configuring unit 22 receives pressing of one of the buttons. When the pressed button is the OK button 1102, the currently selected file x is set as the input value of the parameter. When the pressed button is the cancel button 1104, the process proceeds to step S104, the currently selected file x is updated to file A based on the selected file information included in the copy of the file/folder information described above (hereinafter referred to as "a copy of the selected file information"), and file A is set as the input value of the parameter.

When the user selects a file other than file A, the currently selected file x becomes the file other than file A selected by the user (hereinafter referred to as "file B") (step s105). In this state, when the screen configuring unit 22 receives the pressing of the OK button 1102, the selected file information is updated to file B and file B is set as the input value of the parameter. Further, in this state, when the screen configuring unit 22 receives the pressing of the cancel button 1104, the currently selected file x is updated to file A based on the copy of the selected file information, and file A is set as the input value of the parameter.

In this state, in a case where a file other than file A is deleted from the history before pressing the cancel button 1104, the file deleted from the history before pressing the cancel button 1104 is deleted from the item "entry in history" in the file/folder information of the history screen 1300 (step S106). In the present embodiment, when a file other than file A is deleted from the history, the screen does not completely return to the previous state even if the cancel button 1104 is pressed. The usability is improved in this way, because the concept of the cancellation operation and the concept of deleting a history entry are different concepts for the user. Further, although the currently selected file x is described here as a single file, the currently selected file x may be multiple files.

For example, when file B, which is a file other than file A, is the currently selected file x, and file B is deleted from the history, the currently selected file x is initialized. A plurality of history entries to be subjected to the deletion process may be selected.

Figure 14:
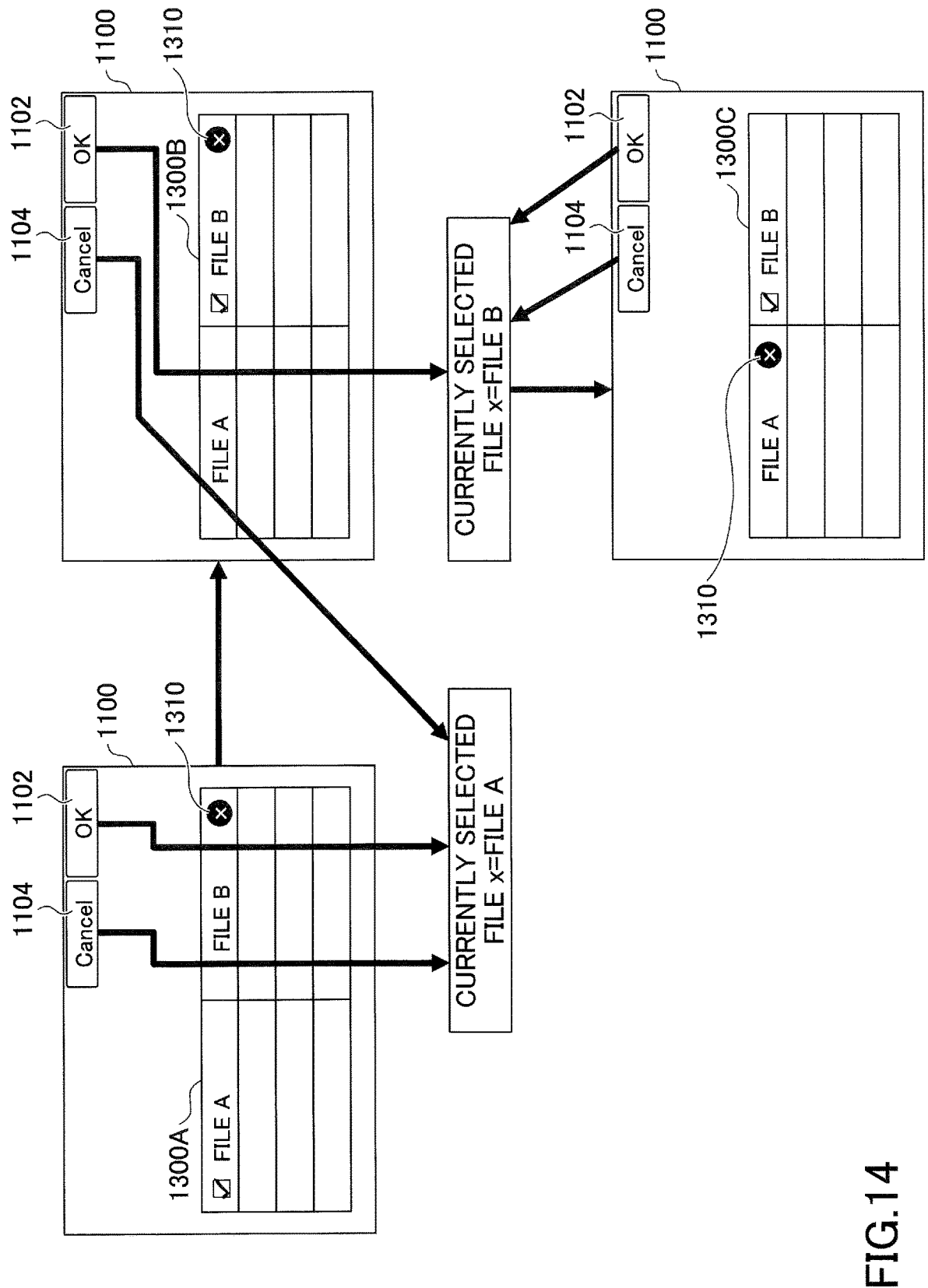
FIG. 14 is a diagram illustrating an example of a relationship between selected file information and a history screen according to the first embodiment of the present invention.

FIG. 14 is a diagram illustrating an example in which the relationship between the selected file information and the history screen is described. FIG. 14 illustrates the file selection screen 1100 including the history screen 1300, and it is a precondition that a previously selected file (hereinafter referred to as "file A") exists. File A is set in the selected file information of the file/folder information holding unit 60.

In a history screen 1300A at the upper left of FIG. 14, the delete button 1310 for file A set in the selected file information, is not displayed, so that it is not possible to delete the history entry of file A. Further, in the history screen 1300A at the upper left of FIG. 14, the delete button 1310 for file B that is not set in the selected file information, is displayed, so that it is possible to delete the history entry of file B.

When the cancel button 1104 is pressed in the state of the history screen 1300A at the upper left of FIG. 14, file A that is set in the copy of the selected file information, is set as the input value of the parameter.

When the OK button 1102 is pressed in the state of the history screen 1300A at the upper left of FIG. 14, file A that is currently selected (ticked) in the history screen 1300A is set as the input value of the parameter.

A history screen 1300B at the upper right of FIG. 14 illustrates a state in which file A in the history screen 1300A at the upper left of FIG. 14 is unticked and file B is ticked (the state in which file B is selected). In the history screen 1300B at the upper right of FIG. 14, the delete button 1310 of file A, which is set in the copy of the selected file information, is not displayed, and deletion of the history entry of file A remains disabled.

When the cancel button 1104 is pressed in the state of the history screen 1300B at the upper right of FIG. 14, the operation of selecting file B is canceled, and file A, which is set in the copy of the selected file information, is set as the input value of the parameter.

When the OK button 1102 is pressed while the history screen 1300B is displayed, as depicted at the upper right of FIG. 14, the currently selected file B in the history screen 1300B is set as the input value of the parameter. After the OK button 1102 is pressed in the state of the history screen 1300B at the upper right of FIG. 14, the screen transitions to the file selection screen 1100 again, and a history screen 1300C at the bottom of FIG. 14 is displayed.

In the history screen 1300C at the bottom of FIG. 14, the delete button 1310 for file B is not displayed, because file B is set in the copy of the selected file information. Accordingly, it is not possible to delete the history entry of file B. In the history screen 1300C illustrated at the bottom of FIG. 14, the delete button 1310 for file A is displayed, because file A is not set in the copy of the selected file information. Accordingly, it is possible to delete the history entry of file A.

As described above, in the information processing system 1 according to the present embodiment, the file set as the input value of the parameter will not be deleted from the history screen, thereby preventing a situation where it is not possible to return to the original parameter selection when the cancel button 1104 is pressed. In the present embodiment, the history entry is deleted as an example. However, the deletion may be applied to other lists as long as entries in the list can be deleted, such as the deletion of a search result.

Second Embodiment

In the first embodiment, an example in which the file/folder information held by the file/folder information holding unit 60 is not linked among the file list screen 1200, the history screen 1300, and a search screen 1500 included in the file selection screen 1100, is described. In a second embodiment, the file/folder information held by the file/folder information holding unit 60 is linked among the file list screen 1200, the history screen 1300, and the search screen 1500.

FIGS. 15A and 15B are diagrams illustrating an example of the selected file information being linked/not being linked among a list screen, a history screen, and a search screen. FIG. 15A illustrates an example in which the selected file information is not linked. FIG. 15B illustrates an example in which the selected file information is linked.

As described above, the file list screen 1200, the history screen 1300, and the search screen 1500 can transition to one another. In FIG. 15A, the file/folder information held by the file/folder information holding unit 60 is not linked among the file list screen 1200, the history screen 1300, or the search screen 1500. For this reason, even if file A and file B are selected in the file list screen 1200, if the screen transitions to the history screen 1300 or the search screen 1500, the selected states of file A and file B will be canceled.

In FIG. 15B, the file/folder information held by the file/folder information holding unit 60 is linked among the file list screen 1200, the history screen 1300, and the search screen 1500. For this reason, when file A and file B are selected in the file list screen 1200, and the screen transitions to the history screen 1300 or the search screen 1500, the selected states of file A and file B will be maintained.

In FIG. 15A, when file A is the file that has been selected in the file list screen 1200 in the immediately preceding instance, information indicating that file A is selected in the file list screen 1200 but file A is not selected in the history screen 1300 will be held in the file/folder information holding unit 60. Therefore, when the history screen 1300 is displayed after the file list screen 1200 is displayed, it is possible to delete file A from the history.

In contrast, in FIG. 15B, the file/folder information is linked, and, therefore, file A is also selected in the history screen 1300, and the file/folder information is updated such that file A is set as the input value of the parameter. Therefore, when the history screen 1300 is displayed after the file list screen 1200 is displayed, it is not possible to delete file A from the history.

Third Embodiment

In a third embodiment, the file/folder information held among the respective screens is linked as in the second embodiment, so that even if the file set as the input value of the parameter is deleted from the history, it is possible to return to the original parameter when the cancel button 1104 is pressed.

Figure 16:
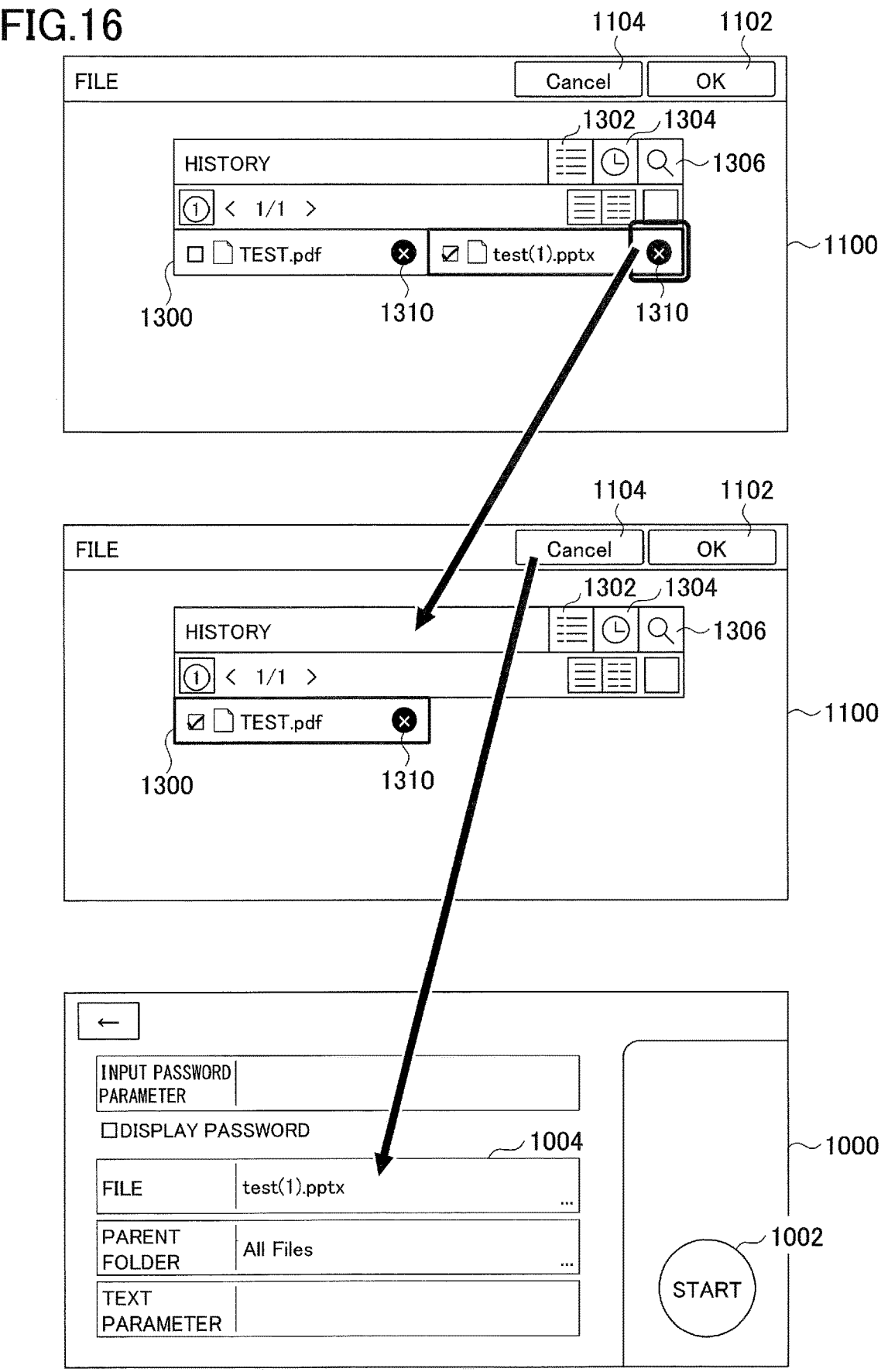
FIG. 16 is a screen transition diagram (1/2) for describing an example of using a cancel button in the history screen according to a third embodiment of the present invention.
Figure 17:
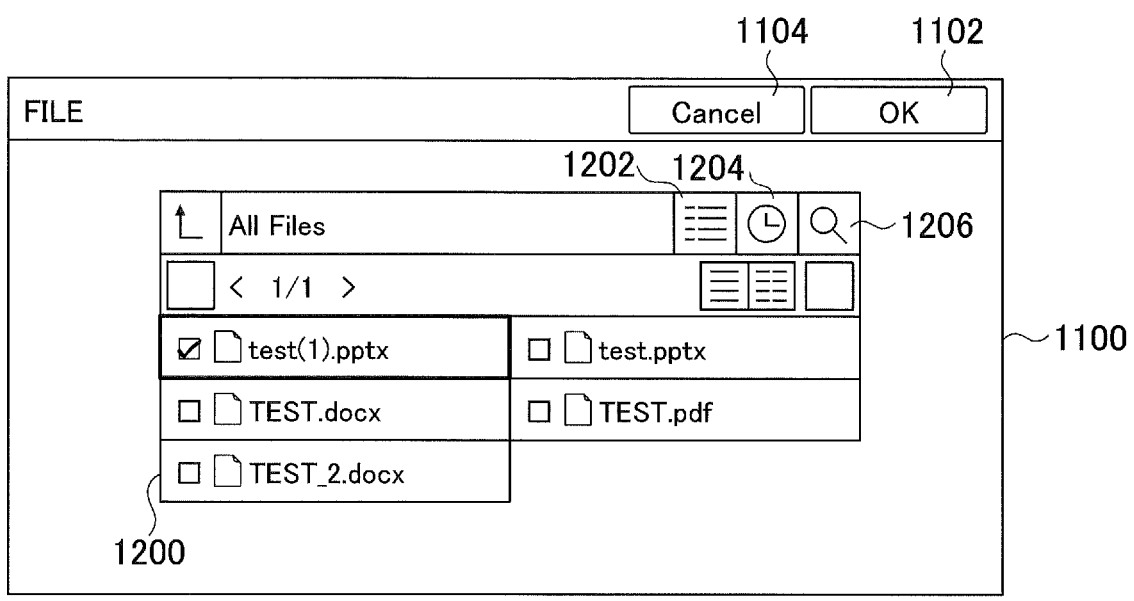
FIG. 17 is a screen transition diagram (2/2) for describing an example of using a cancel button in the history screen according to the third embodiment of the present invention.

FIGS. 16 and 17 are screen transition diagrams of an example of using the cancel button in the history screen. In the third embodiment, the history screen 1300 of FIG. 16 is displayed instead of the history screen 1300 of FIG. 11. In the history screen 1300 illustrated in FIG. 16, the delete button 1310 corresponding to "test(1).pptx" that had been selected when the OK button 1102 was last pressed, is also displayed.

Accordingly, in the history screen 1300 of FIG. 16, by pressing the delete button 1310 corresponding to "test(1).pptx", it is possible to delete "test(1).pptx" from the history. If "test(1).pptx" is deleted from the history and the cancel button 1104 is pressed, "test(1).pptx" that had been selected when the OK button 1102 was last pressed, is set as the input value of the parameter, based on the file/folder information that is linked among the respective screens.

When the user performs the operation to transition to the file selection screen 1100 again, the file list screen 1200, as illustrated in FIG. 17, at the time when the OK button 1102 was last pressed is displayed, instead of the history screen 1300, based on the file/folder information that is linked among the respective screens.

Figure 18:
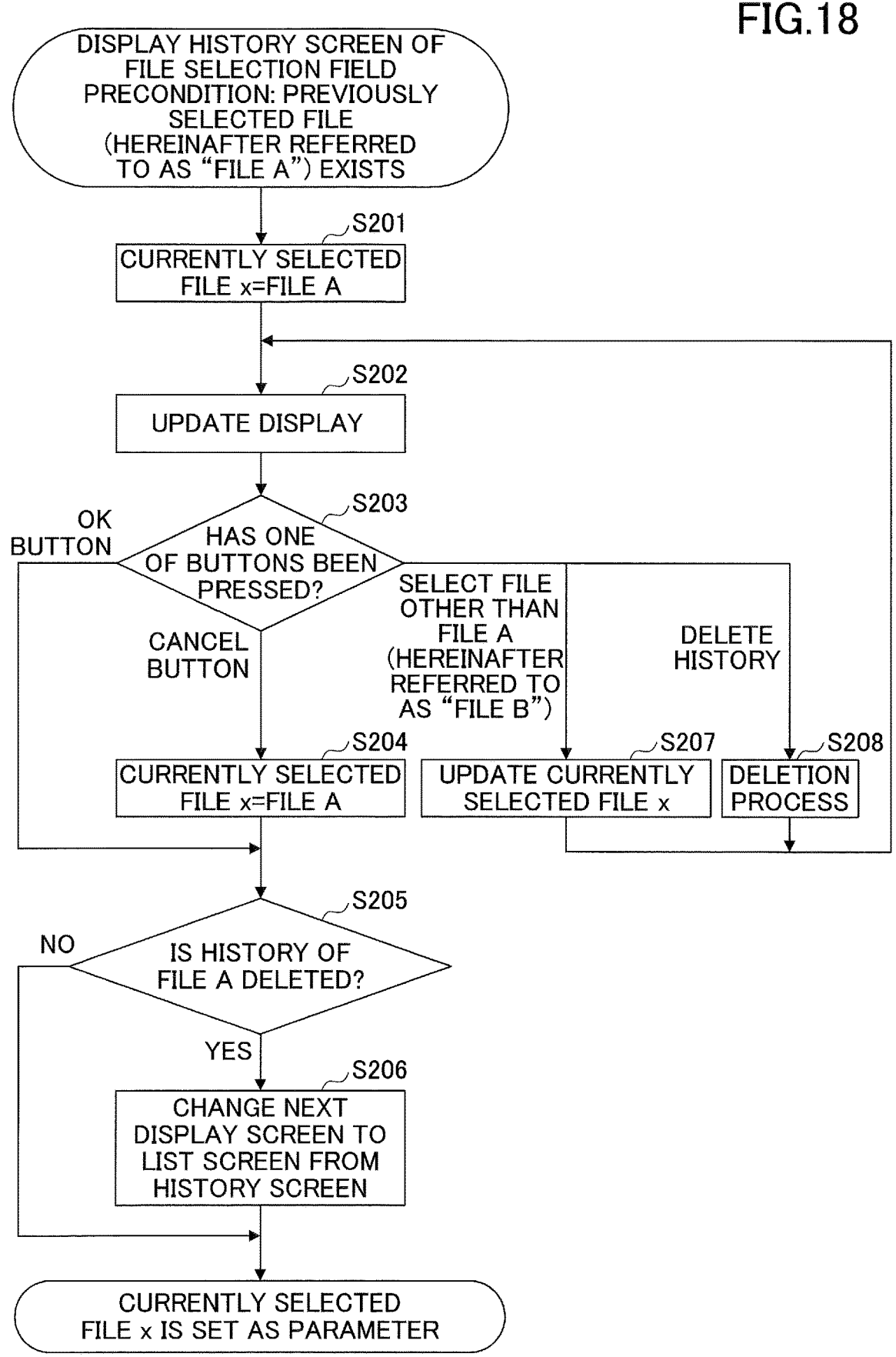
FIG. 18 is a flow chart illustrating an example of a selection file determination process in a history screen according to the third embodiment of the present invention.

FIG. 18 is a flowchart illustrating an example of a selection file determination process in a history screen. In the flowchart illustrated in FIG. 18, it is assumed that the file selection screen 1100 including the history screen 1300 is displayed, and the precondition is that a previously selected file (hereinafter referred to as "file A") exists.

In step S201, the screen configuring unit 22 sets file A as the currently selected file x in the history screen 1300, based on the selected file information. In step S202, the display is updated based on the user's operation. In step S203, the screen configuring unit 22 receives the pressing of one of the buttons.

When the pressed button is the OK button 1102, the process proceeds to step S205, and the screen configuring unit 22 determines whether the history entry of the previously selected file A has been deleted. When the history entry of the previously selected file A has been deleted, the screen configuring unit 22 proceeds to step S206 and changes the next display screen to the file list screen 1200 from the history screen 1300. Further, the screen configuring unit 22 sets the currently selected file x as the input value of the parameter. When the history entry of the previously selected file A has not been deleted, the screen configuring unit 22 skips step S206 and sets the currently selected file x as the input value of the parameter.

When the pressed button is the cancel button 1104, the process proceeds to step S204, the currently selected file x is updated to file A based on the copy of the selected file information, and then the processes from step 5205 and beyond are performed.

When the user selects a file other than file A, the currently selected file x becomes the file other than file A selected by the user (hereinafter referred to as "file B") (step S207). In this state, when the screen configuring unit 22 receives the pressing of the OK button 1102, the selected file information held by the file/folder information holding unit 60 is updated to file B and file B is set as the input value of the parameter. In this state, when the screen configuring unit 22 receives the pressing of the cancel button 1104, the currently selected file x is updated to file A based on the copy of the selected file information, and file A is set as the input value of the parameter. When the pressed button is the delete button 1310, the process of deleting the history entry in step S208 is performed.

Fourth Embodiment

Figure 19:
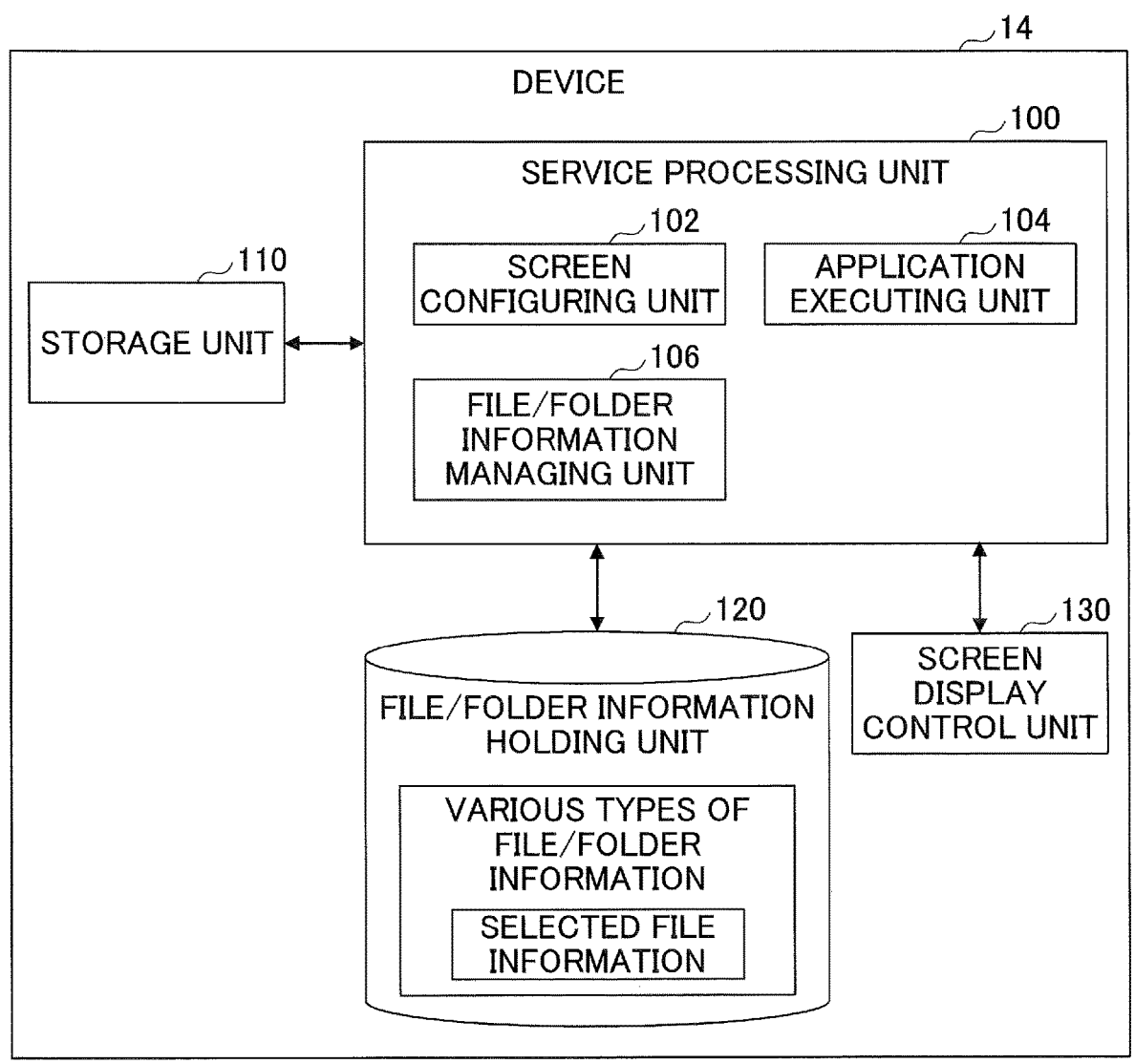
FIG. 19 is a diagram illustrating the functional configuration of an example of a device according to a fourth embodiment of the present invention.

In the first embodiment, an example of the information processing system 1 has been described; however, an embodiment of the present invention is also applicable to the device 14 having a functional configuration as illustrated in FIG. 19. FIG. 19 is a diagram illustrating the functional configuration of an example of the device according to the present embodiment.

The device 14 of FIG. 19 includes a service processing unit 100, a storage unit 110, a file/folder information holding unit 120, and a screen display control unit 130. The service processing unit 100 includes a screen configuring unit 102, an application executing unit 104, and a file/folder information managing unit 106.

The file/folder information holding unit 120 corresponds to the file/folder information holding unit 60 of FIG. 4. The service processing unit 100 corresponds to the web service processing unit 20 of FIG. 4. The service processing unit 100 performs processing for a user to use various services by using the operation panel 602 of the device 14.

The screen configuring unit 102 corresponds to the browser 50 of FIG. 4 and constructs a screen to be displayed on the operation panel 602 of the device 14. Thus, the operation panel 602 of the device 14 displays a screen for using the services provided by the service processing unit 100.

Further, the screen configuring unit 102, the application executing unit 104, and the file/folder information managing unit 106 correspond to the screen configuring unit 22, the application executing unit 24, and the file/folder information managing unit 26 of FIG. 4. The storage unit 110 corresponds to the external storage service 12 of FIG. 4.

(Overview)

According to the present embodiment, in the device 14 in which the screen transitions according to the operation of the user, it is possible to prevent a situation where it is not possible to return to the original parameter selection by a cancellation operation of cancelling the operation of the parameter selection.

The present invention is not limited to the above-described embodiments specifically disclosed, and various modifications and changes may be made without departing from the scope of the claims. Each of the functions of the embodiments described above may be implemented by one or more processing circuitries. The term "processing circuitry" as used herein includes devices such as a processor programmed to execute each function by software, such as a processor implemented by electronic circuitry, an application specific integrated circuit (ASIC), a digital signal processor (DSP), a field programmable array (FPGA), and conventional circuit modules, etc., designed to perform each of the functions described above.

According to one embodiment of the present invention, an information processing system that prevents a situation where it is not possible to return to the original parameter selection by a cancellation operation, can be provided.

The information processing system, the information processing terminal, and the information processing method are not limited to the specific embodiments described in the detailed description, and variations and modifications may be made without departing from the spirit and scope of the present invention.

What is claimed is:

1. An information processing system in which a screen displayed by an information processing terminal transitions to another screen according to an operation by a user, the information processing system comprising:
   a screen configurator configured to generate screen data of the screen and cause the information processing terminal to display the screen, the screen being configured to accept, from the user, a selection operation of selecting a parameter, a deletion operation of deleting the parameter, a validation operation of validating the parameter selected by the selection operation, and a cancellation operation of cancelling the selection operation; and
   an information manager configured to manage parameter information of the parameter for which the validation operation was last accepted, by holding the parameter information in a holder, wherein
   the screen configurator generates the screen data so as to reject the deletion operation of the user to delete the parameter for which the validation operation was last accepted, based on the parameter information held by the holder.

2. The information processing system according to claim 1, wherein the information manager manages and holds, in the holder, selection operation information of the selection operation of selecting the parameter, for each of a plurality of types of the screen, such that the selection operation information is synchronized among the plurality of types of the screen.

3. The information processing system according to claim 2, wherein
   the screen configurator
      generates the screen data so as to accept the deletion operation of deleting the parameter for which the validation operation was last accepted, and
      displays the selection operation information of one type of the screen that has accepted the deletion operation of delating the parameter, on another type of the screen that is different from the one type of the screen.

4. The information processing system according to claim 1, wherein the screen configurator generates the screen data so as not to display, in the screen, a button used for accepting the deletion operation of deleting the parameter for which the validation operation was last accepted.

5. The information processing system according to claim 1, wherein the screen configurator generates the screen data so as to reject the deletion operation of deleting the parameter and display a message indicating that the deletion operation of deleting the parameter will not be accepted, upon detecting pressing of a button used for accepting the deletion operation of deleting the parameter for which the validation operation was last accepted.

6. The information processing system according to claim 1, wherein the parameter is one or more files or folders.

7. The information processing system according to claim 6, wherein the screen includes a history screen in which the one or more files or folders are selectable from a file or a folder in a history, and a search screen in which the one or more files or folders are selectable from a file or a folder found as a result of searching.

8. An information processing terminal in which a displayed screen transitions to another screen according to an operation by a user, the information processing terminal comprising:
   a screen configurator configured to generate screen data of the screen and cause a display to display the screen, the screen being configured to accept, from the user, a selection operation of selecting a parameter, a deletion operation of deleting the parameter, a validation operation of validating the parameter selected by the selection operation, and a cancellation operation of cancelling the selection operation; and
   an information manager configured to manage parameter information of the parameter for which the validation operation was last accepted, by holding the parameter information in a holder, wherein
   the screen configurator generates the screen data so as to reject the deletion operation of the user to delete the parameter for which the validation operation was last accepted, based on the parameter information held by the holder.

9. An information processing method executed in an information processing system in which a screen displayed by an information processing terminal transitions to another screen according to an operation by a user, the information processing method comprising:
   generating screen data of the screen and causing the information processing terminal to display the screen, the screen being configured to accept, from the user, a selection operation of selecting a parameter, a deletion operation of deleting the parameter, a validation operation of validating the parameter selected by the selection operation, and a cancellation operation of cancelling the selection operation; and managing parameter information of the parameter for which the validation operation was last accepted, by holding the parameter information in a holder, wherein the generating includes generating the screen data so as to reject the deletion operation of the user to delete the parameter for which the validation operation was last accepted, based on the parameter information held by the holder.

10. A non-transitory computer-readable recording medium storing a program that causes a computer to execute a process for performing the information processing method according to claim 9.

* * * * *